(12) United States Patent
Imachi et al.

(10) Patent No.: US 6,482,550 B1
(45) Date of Patent: Nov. 19, 2002

(54) NON-AQUEOUS SECONDARY BATTERY

(75) Inventors: Naoki Imachi, Sumoto (JP); Hiroshi Watanabe, Sumoto (JP); Satoshi Narukawa, Sumoto (JP)

(73) Assignee: Sanyo Electric Co., Ltd., Osaka (JP)

(*) Notice: Subject to any disclaimer, the term of this patent is extended or adjusted under 35 U.S.C. 154(b) by 5 days.

(21) Appl. No.: 09/704,841

(22) Filed: Nov. 3, 2000

(30) Foreign Application Priority Data

Nov. 12, 1999 (JP) ............................................ 11-322150

(51) Int. Cl.⁷ ........................... H01M 10/40; H01M 4/52
(52) U.S. Cl. ................. 429/338; 429/231.3; 429/231.6; 429/307
(58) Field of Search ..................................... 429/330, 331, 429/338, 231.3, 231.6, 306, 307

(56) References Cited

U.S. PATENT DOCUMENTS

| 5,429,890 A | * | 7/1995 | Pynenburg et al. .. 429/231.3 X |
| 5,609,975 A | * | 3/1997 | Hasegawa et al. ... 429/231.3 X |
| 5,871,863 A | * | 2/1999 | Miyasaka ............ 429/231.3 X |
| 5,891,588 A | * | 4/1999 | Sakai et al. ............. 429/338 X |
| 6,203,942 B1 | * | 3/2001 | Gan et al. ............... 429/330 X |
| 6,210,839 B1 | * | 4/2001 | Gan et al. ............... 429/330 X |

FOREIGN PATENT DOCUMENTS

JP                9-293538        11/1997

* cited by examiner

Primary Examiner—Stephen Kalafut
(74) Attorney, Agent, or Firm—Nixon & Vanderhye P.C.

(57) ABSTRACT

A non-aqueous secondary battery comprising a negative electrode made of an active negative electrode material capable of intercalating/deintercalating lithium ion, a positive electrode made of spinel type lithium manganese oxide as a main active positive electrode material and an electrolyte containing a non-aqueous solvent is characterized in that said positive electrode comprises lithium cobalt oxide in admixture with spinel type lithium manganese oxide having crystal lattices partially substituted by magnesium or aluminum and said non-aqueous solvent comprises vinylene carbonate incorporated therein.

17 Claims, 10 Drawing Sheets

NON-AQUEOUS SECONDARY BATTERY

BACKGROUND OF THE INVENTION

1. Field of the Invention

The present invention relates to a non-aqueous secondary battery comprising a negative electrode made of an active negative electrode material capable of intercalating/deintercalating lithium ion, a positive electrode made of spinnel type lithium manganese oxide as a main active positive electrode material and an electrolyte containing a non-aqueous solvent.

2. Description of the Related Art

In recent years, as a battery for portable electronic and communications equipment such as portable telephone and note type personal computer there has been practically used a rechargeable non-aqueous battery having a light weight and a high capacity such as lithium ion battery comprising an alloy or carbon material capable of intercalating/deintercalating lithium ion as an active negative electrode material and a lithium-containing transition metal oxide such as lithium cobalt oxide ($LiCoO_2$), lithium nickelate ($LiNiO_2$) and lithium manganese oxide ($LiMn_2O_4$) as a positive electrode material.

Among the foregoing lithium-containing transition metal oxides as positive electrode material constituting the non-aqueous battery, lithium nickel oxide ($LiNiO_2$) has a high capacity but is greatly disadvantageous in that it is inferior to lithium cobalt oxide ($LiCoO_2$) in safety and properties. For example, lithium nickel oxide ($LiNiO_2$) exhibits a high overvoltage. Further, lithium manganese oxide ($LiMn_2O_4$) occurs in abundance and thus can be available at a low price but is greatly disadvantageous in that it has a low energy density and manganese itself is dissolved at high temperatures. Thus, lithium manganese oxide ($LiMn_2O_4$) is inferior to lithium cobalt oxide ($LiCoO_2$). Therefore, it is a main practice at present to use lithium cobalt oxide ($LiCoO_2$) as a lithium-containing transition metal oxide.

However, as such a type of non-aqueous battery has been used not only for consumers' small-sized apparatus such as small-sized video camera, portable telephone, note type personal computer and other portable electronic and communications equipment but also for large-sized apparatus such as hybrid automobile, lithium manganese oxide ($LiMn_2O_4$), which occurs in abundance and thus can be available at a low price, has been noted as a substitute for lithium cobalt oxide ($LiCoO_2$), which occurs less than lithium manganese oxide. Under these circumstances, in order to eliminate the problem of low energy density lithium manganese oxide ($LiMn_2O_4$), JP-A-9-293538 (The term "JP-A" as used herein means an "unexamined published Japanese patent application") discloses the incorporation of lithium cobalt oxide ($LiCoO_2$) or lithium nickel oxide in lithium manganese oxide ($LiMn_2O_4$) in an attempt to eliminate such a problem.

However, even the approach proposed in the above cited JP-A-9-293538 leaves something to be desired. Particularly important properties to be improved in a positive electrode comprising lithium manganese oxide ($LiMn_2O_4$) as an active positive electrode material are high temperature cycle properties and storage properties. Referring to high temperature cycle properties, many studies have been made of stabilization of crystal structure by the addition of foreign elements or other approaches. However, chromium or other effective substituent elements are harmful substances. Further, when these substituent elements are added in a large amount, it causes problems such as deterioration of energy density. Thus, no practical solutions have been found yet.

Referring to storage properties, lithium manganese oxide ($LiMn_2O_4$) reacts readily with the electrolytic solution to undergo self-discharging, eventually causing the production of gas that deteriorates the battery properties. This phenomenon occurs remarkably when the battery is stored discharged. Further, when stored at high temperatures, manganese is dissolved to produce a large amount of gas. No effective means for improving storage properties have been found yet.

SUMMARY OF THE INVENTION

The present invention has been worked out to solve the foregoing problems. An object of the present invention is to provide a non-aqueous secondary battery which undergoes inhibited self-discharging and exhibits excellent discharged storage properties and high temperature storage properties, a high discharge operating voltage, a high energy density and an improved safety despite the use of lithium manganese oxide ($LiMn_2O_4$) as a main active positive electrode material.

To this end, the non-aqueous secondary battery of the present invention comprises a positive electrode made of spinnel type lithium manganese oxide having crystal lattices partially substituted by magnesium or aluminum mixed with lithium cobalt oxide and a non-aqueous solvent having vinylene carbonate (VC) incorporated therein.

The spinnel type lithium manganese oxide acts as a strong oxidizing agent and thus reacts with the electrolytic solution or electrolyte salt to produce a large amount of gas. This not only deteriorates the properties of the battery but also produces abnormal inner pressure that deforms the battery and causes the leakage of electrolytic solution, deteriorating the safety of the battery.

However, the partial substitution of crystal lattices by magnesium or aluminum makes it possible to depress the activity of spinnel type lithium manganese oxide and hence minimize the deterioration of the battery during high temperature charged storage and the production of gas. The incorporation of lithium cobalt oxide, which acts to inhibit the reaction with the electrolytic solution, causes the reduction of the produced amount of gas and the voltage drop and hence the rise in the percent retention of capacity and percent recovery of capacity. As the added amount of lithium cobalt oxide increases, this phenomenon becomes more remarkable. The incorporation of vinylene carbonate (VC) in the non-aqueous solvent makes it possible to further lower the produced amount of gas because vinylene carbonate forms a decomposition product film mainly on the negative electrode to relax the reaction with the non-aqueous electrolyte. As a result, a non-aqueous secondary battery having excellent discharged storage properties and high temperature storage properties, a high discharged operating voltage, a high energy density and an enhanced safety can be obtained.

As the added amount of lithium cobalt oxide increases, the resulting buffering action becomes more remarkable. Thus, the added amount of lithium cobalt oxide is preferably 0.05 parts (5% by weight) based on the total weight of the active positive electrode material. It has generally be thought that since the discharged operating voltage of lithium cobalt oxide is lower than that of lithium manganese oxide, the discharged operating voltage of lithium manganese oxide mixed with lithium cobalt oxide is lower than that of lithium manganese oxide alone. However, since lithium cobalt oxide has a better electronic conductivity than lithium manganese oxide, the incorporation of lithium cobalt oxide causes a rise in the discharged operating voltage.

However, when lithium cobalt oxide is added in an amount of greater than 0.3 parts (30% by weight) based on the total weight of the active positive electrode material, the effect of lithium cobalt oxide itself becomes more remarkable, deteriorating the overcharging properties. Thus, the added amount of lithium cobalt oxide preferably falls below 0.3 parts (30% by weight). It is preferred after all that lithium cobalt oxide be added so as to satisfy the relationship $0.05 \leq B/(A+B)<0.3$, preferably $0.05 \leq B/(A+B)<0.2$ in which A represents the mass of spinnel type lithium manganese oxide having crystal lattices partially substituted by magnesium or aluminum and B represents the mass of lithium cobalt oxide.

As vinylene carbonate (VC) is added more, the thickness of the decomposition product film formed on the negative electrode increases, relaxing more the reaction with the non-electrolyte and hence making it possible to further reduce the produced amount of gas. However, when vinylene carbonate is added in too great an amount, the amount of resistive components on the surface of the electrode plates increases. Thus, it is necessary that the added amount of vinylene carbonate (VC) be restricted so as to reach a proper film thickness. The added amount of vinylene carbonate is preferably 0.03 parts (3% by weight) or less based on the total weight of the non-aqueous solvent.

The retention of capacity per the atomic ratio of lithium and magnesium or lithium and aluminum to manganese in the spinnel type lithium manganese oxide substituted by magnesium or aluminum ((Li+Mg)/Mn or (Li+Al)/Mn) at a high temperature (60° C.) was experimentally determined. As a result, as the atomic ratio increases, the retention of capacity at a high temperature increases. However, when the atomic ratio increases beyond 0.62, the retention of capacity at a high temperature no longer increases. On the other hand, as the atomic ratio increases, the ratio of capacity to active positive electrode material decreases. Thus, the upper limit of the atomic ratio ((Li+Mg)/Mn or (Li+Al)/Mn) is preferably 0.62 or less.

Further, as the atomic ratio ((Li+Mg)/Mn or (Li+Al)/Mn) decreases, manganese is dissolved more at high temperatures and deposited on the negative electrode, deteriorating the surface conditions of the electrode plate. Thus, the incorporation of vinylene carbonate in the electrolytic solution causes vinylene carbonate to be electrolytically decomposed on the negative electrode side to form a film on the negative electrode, inhibiting the dissolution of manganese. However, in the area where manganese is dissolved more, the effect of dissolution of manganese appears more than the amount of the film formed on the negative electrode by vinylene carbonate, causing a sudden drop of retention of capacity. This phenomenon occurs in the area where the atomic ratio ((Li+Mg)/Mn or (Li+Al)/Mn) is in the vicinity of 0.54. It is thought that as the added amount of vinylene carbonate increases, the atomic ratio is shifted toward smaller side. However, since the increase in the added amount of vinylene carbonate has an adverse effect, the lower limit of the atomic ratio ((Li+Mg)/Mn or (Li+Al)/Mn) is preferably 0.54 or more.

As above described, the upper limit of the atomic ratio is determined by at a high temperature and the ratio of capacity to active positive electrode material. And the lower limit of the atomic ratio is determined by the relationship between vinylene carbonate and the retention of capacity.

After all, from the foregoing standpoint of view, the atomic ratio is determined such that the atomic ratio satisfies the relationship $0.54 \leq (Li+M (M=Mg, Al))/Mn \leq 0.62$.

The positive electrode of the invention made of spinnel type lithium manganese oxide substituted by magnesium or aluminum mixed with lithium cobalt oxide is greatly characterized by that it can be applied not only to a non-aqueous secondary battery comprising an organic electrolytic solution but also to a non-aqueous battery comprising a polymer solid electrolyte. A polymer solid electrolyte has a greater viscosity than an electrolytic solution and thus can be hardly retained by the positive electrode singly made of spinnel type lithium manganese oxide substituted by magnesium or aluminum. However, the positive electrode made of spinnel type lithium manganese oxide substituted by magnesium or aluminum mixed with lithium cobalt oxide can be formed thinner and thus can eliminate the problem of poor retention of electrolyte.

As the polymer solid electrolyte there is preferably used a solid electrolyte obtained by gelatinizing a polymer selected from the group consisting of polycarbonate-based solid polymer, polyacrylonitrile-based solid polymer, copolymer or crosslinked polymer comprising two or more of these polymers and fluorine-based solid polymer such as polyvinylidene fluoride (PVdF), a lithium salt and an electrolytic solution in combination.

DESCRIPTION OF THE PREFERRED EMBODIMENTS

Figure 1:
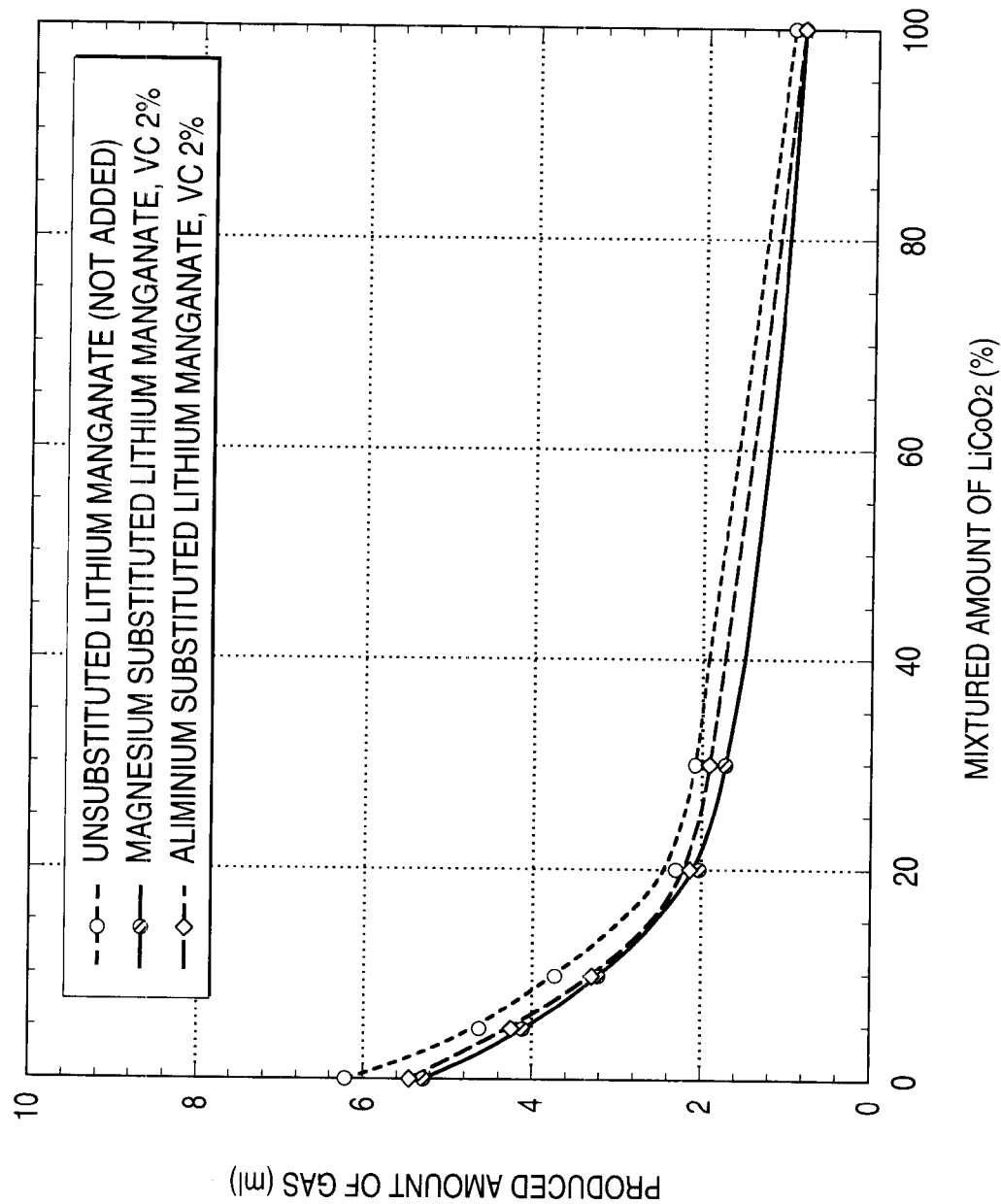
FIG. 1 is a graph illustrating the relationship between the added amount of lithium cobalt oxide and the produced amount of gas in the case where batteries are charged to 4.2 V, and then stored at a temperature of 60° C. for 20 days.

Embodiment of implication of the present invention will be described hereinafter.

1. Preparation of Positive Electrode

(1) Positive Electrode Comprising Magnesium-substituted Spinnel Type Lithium Manganese Oxide

Magnesium-substituted spinnel type lithium manganese oxide represented by $Li_{1.07}Mn_{1.89}Mg_{0.04}O_4$ and lithium cobalt oxide represented by $LiCoO_2$ were mixed at predetermined ratios. To the mixtures were each then added a proper amount of a carbon-based electrically conducting agent and graphite. The mixed powders thus obtained were each then charged in a mixing apparatus (e.g., Type AM-15F mechanofusion apparatus, produced by HOSOKAWA MICRON CORP.). The mixing apparatus was then operated at a rotary speed of 1,500 revolutions per minute (1,500 r.p.m.) for 10 minutes so that the mixed powders were each stirred under compression, impact and shearing to form a mixed active positive electrode material. This mixing action causes lithium cobalt oxide to come in electrical contact with magnesium-substituted spinnel type lithium manganese oxide. Subsequently, these mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates x comprising magnesium-substituted spinnel type lithium manganese oxide.

Among these positive electrode plates x, the positive electrode plate x1 was prepared from a 100:0 (hereinafter by weight) mixture of magnesium-substituted spinnel type lithium manganese oxide represented by $Li_{1.07}Mn_{1.89}Mg_{0.04}O_4$ and lithium cobalt oxide represented by $LiCoO_2$, the positive electrode plate x2 was prepared from a 95:5 mixture of magnesium-substituted spinnel type lithium manganese oxide and lithium cobalt oxide, the positive electrode plate x3 was prepared from a 90:10 mixture of magnesium-substituted spinnel type lithium manganese oxide and lithium cobalt oxide, the positive electrode plate x4 was prepared from a 80:20 mixture of magnesium-substituted spinnel type lithium manganese oxide and lithium cobalt oxide, the positive electrode plate x5 was prepared from a 70:30 mixture of magnesium-substituted spinnel type lithium manganese oxide and lithium cobalt oxide, and the positive electrode plate x6 was prepared from a 0:100 mixture of magnesium-substituted spinnel type lithium manganese oxide and lithium cobalt oxide.

(2) Positive Electrode Comprising Aluminum-substituted Spinnel Type Lithium Manganese Oxide

Aluminum-substituted spinnel type lithium manganese oxide represented by $Li_{1.07}Mn_{1.89}Al_{0.04}O_4$ and lithium cobalt oxide represented by $LiCoO_2$ were mixed at predetermined ratios. To the mixtures were each then added a proper amount of a carbon-based electrically conducting agent and graphite. The mixed powders thus obtained were each then charged in a mixing apparatus (e.g., Type AM-15F mechanofusion apparatus, produced by HOSOKAWA MICRON CORP.). The mixing apparatus was then operated at a rotary speed of 1,500 revolutions per minute (1,500 r.p.m.) for 10 minutes so that the mixed powders were each stirred under compression, impact and shearing to form a mixed active positive electrode material. This mixing action causes lithium cobalt oxide to come in electrical contact with aluminum-substituted spinnel type lithium manganese oxide. Subsequently, these mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates y comprising aluminum-substituted spinnel type lithium manganese oxide.

Among these positive electrode plates y, the positive electrode plate y1 was prepared from a 100:0 mixture of aluminum-substituted spinnel type lithium manganese oxide represented by $Li_{1.07}Mn_{1.89}Al_{0.04}O_4$ and lithium cobalt oxide represented by $LiCoO_2$, the positive electrode plate y2 was prepared from a 95:5 mixture of aluminum-substituted spinnel type lithium manganese oxide and lithium cobalt oxide, the positive electrode plate y3 was prepared from a 90:10 mixture of aluminum-substituted spinnel type lithium manganese oxide and lithium cobalt oxide, the positive electrode plate y4 was prepared from a 80:20 mixture of aluminum-substituted spinnel type lithium manganese oxide and lithium cobalt oxide, the positive electrode plate y5 was prepared from a 70:30 mixture of aluminum-substituted spinnel type lithium manganese oxide and lithium cobalt oxide, and the positive electrode plate y6 was prepared from a 0:100 mixture of aluminum-substituted spinnel type lithium manganese oxide and lithium cobalt oxide.

(3) Positive Electrode Comprising Unsubstituted Spinnel Type Lithium Manganese Oxide

Spinnel type lithium manganese oxide represented by $Li_{1.09}Mn_{1.91}O_4$ and lithium cobalt oxide represented by $LiCoO_2$ were mixed at predetermined ratios. To the mixtures were each then added a proper amount of a carbon-based electrically conducting agent and graphite. The mixed powders thus obtained were each then charged in a mixing apparatus (e.g., Type AM-15F mechanofusion apparatus, produced by HOSOKAWA MICRON CORP.). The mixing apparatus was then operated at a rotary speed of 1,500 revolutions per minute (1,500 r.p.m.) for 10 minutes so that the mixed powders were each stirred under compression, impact and shearing to form a mixed active positive electrode material. This mixing action causes lithium cobalt oxide to come in electrical contact with lithium manganese oxide. Subsequently, these mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates z comprising unsubstituted spinnel type lithium manganese oxide.

Among these positive electrode plates z, the positive electrode plate z1 was prepared from a 100:0 mixture of spinnel type lithium manganese oxide represented by $Li_{1.09}Mn_{1.91}O_4$ and lithium cobalt oxide represented by $LiCoO_2$, the positive electrode plate z2 was prepared from a 95:5 mixture of spinnel type lithium manganese oxide and lithium cobalt oxide, the positive electrode plate z3 was prepared from a 90:10 mixture of spinnel type lithium manganese oxide and lithium cobalt oxide, the positive electrode plate z4 was prepared from a 80:20 mixture of spinnel type lithium manganese oxide and lithium cobalt oxide, the positive electrode plate z5 was prepared from a 70:30 mixture of spinnel type lithium manganese oxide and lithium cobalt oxide, and the positive electrode plate z6 was prepared from a 0:100 mixture of spinnel type lithium manganese oxide and lithium cobalt oxide.

2. Preparation of Negative Electrode

An active negative electrode material capable of intercalating/deintercalating lithium ion, a rubber-based binder and water were mixed to prepare a negative electrode compound. The negative electrode compound thus prepared was then applied to a negative electrode collector made of copper foil on both sides thereof. The coated material was then rolled to obtain a negative electrode plate. As the active negative electrode material there is preferably used a carbon-based material capable of intercalating/deintercalating lithium ion such as graphite, carbon black, coke, glass-like carbon, carbon fiber and calcination product thereof. Alternatively, an oxide capable of intercalating/deintercalating lithium ion such as tin oxide and titanium oxide may be used.

3. Preparation of Electrolytic Solution (1) Electrolytic Solution Having Vinylene Carbonate (VC) Incorporated Therein To a 3:7 (by volume) mixture of ethylene carbonate (EC) and diethyl carbonate (DEC) were added lithium hexafluorophosphate ($LiPF_6$) and vinylene carbonate (VC) as electrolyte salts in an amount of 1 mol/l and 0.02 parts (2% by weight) based on the total weight of solvents, respectively, to prepare an electrolytic solution α.

(2) Electrolytic Solution Free of Vinylene Carbonate (VC)

Separately, to a 3:7 (by volume) mixture of ethylene carbonate (EC) and diethyl carbonate (DEC) was added lithium hexafluorophosphate ($LiPF_6$) as an electrolyte salt to prepare an electrolytic solution β.

As the mixed solvent there may be used an aprotic solvent incapable of supplying hydrogen ion such as mixture of dimethyl carbonate (DMC) and ethyl methyl carbonate (EMC) besides the foregoing mixture of ethylene carbonate (EC) and diethyl carbonate (DEC). The mixing ratio of one selected from the group consisting of DEC, DMC and EMC to EC is from 5:95 to 60:40. As the electrolyte there may be used an imide salt such as $LiPF_{6-x}(C_2F_5)_x$, $LiBF_4$, $LiClO_4$ and $LiN(SO_2C_2F_5)_2$ besides $LiPF_6$.

4. Preparation of Test Lithium Ion Battery

To the positive electrode plates x1 to x6, y1 to y6 and z1 to z6 thus prepared were each connected a lead wire. Separately, to the negative electrode plate prepared as mentioned above was connected a lead wire. Each of these positive electrode plates and the negative electrode plate were spirally wound with a polypropylene separator provided interposed therebetween to prepare various spiral electrode bodies. These spiral electrode bodies were each inserted in an outer battery can. The lead wires were then connected to a positive electrode terminal and a negative electrode terminal, respectively.

Into each of these outer cans was then injected the electrolytic solution α or β. These outer cans were each sealed to prepare test batteries A1 to A6, B1 to B6, C1 to C6, D1 to D6, E1 to E6 and F1 to F6 having a nominal capacity of 500 mAH. The battery may be in thin, rectangular or cylindrical form. The size of the battery is not specifically limited.

Among these test lithium ion batteries, the batteries A1 to A6 were prepared from the positive electrode plates x1 to x6, respectively, and the electrolytic solution α, the batteries B1 to B6 were prepared from the positive electrode plates y1 to y6, respectively, and the electrolytic solution α, and the batteries C1 to C6 were prepared from the positive electrode plates z1 to z6, respectively, and the electrolytic solution α. The batteries D1 to D6 were prepared from the positive electrode plates x1 to x6, respectively, and the electrolytic solution β, the batteries E1 to E6 were prepared from the positive electrode plates y1 to y6, respectively, and the electrolytic solution β, and the batteries F1 to F6 were prepared from the positive electrode plates z1 to z6, respectively, and the electrolytic solution β.

5. Test (1) High Temperature Charged Storage Test

The batteries A1 to A6, B1 to B6, C1 to C6, D1 to D6, E1 to E6 and F1 to F6 thus prepared were each subjected to 4.2 V–500 mA constant current-constant voltage charging and 500 mA constant current discharging. In some detail, the batteries were each charged to 4.2 V with a current of 500 mA (1C) at room temperature. After reaching 4.2 V, the batteries were each charged at a constant voltage of 4.2 V until the charging current reached 25 mA or less. After 10 minutes of discontinuance, the batteries were each discharged to a discharge termination voltage of 3.0 V with a current of 500 mA (1C). After thus subjected to charging and discharging, the batteries were each charged to 4.2 V with a current of 500 mA (1C) at room temperature. After reaching 4.2 V, the batteries were each charged at a constant voltage of 4.2 V until the charging current reached 25 mA or less, and then stored at a temperature of 60° C. for 20 days.

The batteries A1 to A6, B1 to B6, C1 to C6, D1 to D6, E1 to E6, and F1 to F6 thus stored were each then measured for battery voltage (V) and produced amount (ml) of gas. Thereafter, the discharge capacity after storage was determined from the discharging time required until the discharge termination voltage reaches 3.0 V with a current of 50 mA (1C). The ratio of the discharge capacity after storage to the initial capacity was then calculated to determine the percent retention of capacity. The batteries were each again subjected to charging and discharging. The recovered capacity was then determined from the discharging time. The ratio of the recovered capacity to the initial capacity was then calculated to determine the percent recovery of capacity. The results are set forth in Tables 1 and 2 below. The results of the relationship between the added amount (%) of lithium cobalt oxide and the produced amount (ml) of gas of the batteries A1 to A6, B1 to B6, C1 to C6, D1 to D6, E1 to E6, and F1 to F6 thus stored charged are graphically illustrated in FIG. 1.

TABLE 1

| Type of Battery | Type of positive electrode | Electrolytic solution | Voltage drop (V) | Produced amount of gas (ml) | % Retention of capacity | % Recovery of capacity |
|---|---|---|---|---|---|---|
| A1 | x1 | α | 0.14 | 5.3 | 64 | 79 |
| A2 | x2 | α | 0.14 | 4.0 | 66 | 81 |
| A3 | x3 | α | 0.12 | 3.2 | 66 | 82 |
| A4 | x4 | α | 0.11 | 2.0 | 68 | 84 |
| A5 | x5 | α | 0.11 | 1.7 | 68 | 84 |
| A6 | x6 | α | 0.11 | 0.9 | 70 | 87 |
| B1 | y1 | α | 0.15 | 5.5 | 63 | 76 |
| B2 | y2 | α | 0.14 | 4.2 | 64 | 79 |
| B3 | y3 | α | 0.12 | 3.2 | 65 | 80 |
| B4 | y4 | α | 0.11 | 2.1 | 67 | 83 |
| B5 | y5 | α | 0.11 | 1.9 | 68 | 84 |
| B6 | y6 | α | 0.11 | 0.9 | 70 | 87 |
| C1 | z1 | α | 0.18 | 6.3 | 55 | 71 |
| C2 | z2 | α | 0.17 | 4.6 | 57 | 73 |
| C3 | z3 | α | 0.16 | 3.7 | 59 | 76 |
| C4 | z4 | α | 0.14 | 2.3 | 63 | 79 |
| C5 | z5 | α | 0.13 | 2.1 | 64 | 80 |
| C6 | z6 | α | 0.10 | 0.9 | 70 | 87 |

TABLE 2

| Type of Battery | Type of positive electrode | Electrolytic solution | Voltage drop (V) | Produced amount of gas (ml) | % Retention of capacity | % Recovery of capacity |
|---|---|---|---|---|---|---|
| D1 | x1 | β | 0.16 | 5.6 | 60 | 75 |
| D2 | x2 | β | 0.15 | 4.2 | 61 | 78 |
| D3 | x3 | β | 0.13 | 3.3 | 62 | 80 |
| D4 | x4 | β | 0.12 | 2.1 | 64 | 82 |
| D5 | x5 | β | 0.12 | 1.9 | 65 | 82 |
| D6 | x6 | β | 0.11 | 1.0 | 67 | 84 |
| E1 | y1 | β | 0.15 | 5.7 | 58 | 73 |
| E2 | y2 | β | 0.14 | 4.4 | 60 | 75 |
| E3 | y3 | β | 0.13 | 3.3 | 61 | 79 |
| E4 | y4 | β | 0.12 | 2.1 | 63 | 81 |
| E5 | y5 | β | 0.12 | 1.9 | 65 | 82 |
| E6 | y6 | β | 0.11 | 1.0 | 67 | 84 |
| F1 | z1 | β | 0.17 | 6.2 | 56 | 72 |
| F2 | z2 | β | 0.16 | 4.6 | 57 | 73 |
| F3 | z3 | β | 0.15 | 3.7 | 59 | 76 |
| F4 | z4 | β | 0.13 | 2.3 | 63 | 79 |
| F5 | z5 | β | 0.13 | 2.1 | 64 | 80 |
| F6 | z6 | β | 0.11 | 1.0 | 67 | 84 |

As can be seen in Tables 1 and 2 above, the batteries comprising as an active positive electrode material unsubstituted lithium manganese oxide alone (batteries C1 and F1 comprising the positive electrode z1) produce a gas in a large amount. This is presumably because lithium manganese oxide acts as a strong oxidizing agent and thus reacts with the electrolytic solution or electrolyte salt to produce a large amount of gas. This deforms not only the battery comprising a laminated outer body but also the battery comprising a hard case and causes abnormal pressure or leakage of electrolytic solution that drastically deteriorates the reliability of the battery.

On the contrary, when substituted by magnesium (batteries A1 to A5 and D1 to D5 comprising the positive electrodes x1 to x5, respectively) or aluminum (batteries B1 to B5 and E1 to E5 comprising the positive electrodes y1 to y5), lithium manganese oxide exhibits a depressed activity, making it possible to lessen the deterioration and production of gas during high temperature charged storage. As the amount of lithium cobalt oxide to be mixed with lithium manganese oxide increases (x1→x6,y1→y6, z1→z6), the produced amount of gas and the voltage drop decrease, resulting in the rise in the percent retention of capacity and the percent recovery of capacity. This is presumably because lithium cobalt oxide relaxes the reaction with the electrolytic solution more and thus acts as a buffer to lessen the produced amount of gas.

In the case where magnesium-substituted or aluminum-substituted lithium manganese oxide is used as an active positive electrode material and vinylene carbonate (VC) is incorporated in the solvent (batteries A1 to A5 and B1 to B5 comprising the electrolytic solution α), magnesium-substituted or aluminum-substituted lithium manganese oxide exhibits a depressed activity of lithium manganese oxide to inhibit the polymerization decomposition reaction of vinylene carbonate on the positive electrode and cause electrolysis of vinylene carbonate on the negative electrode side, making it possible to form a good film on the negative electrode.

In the case where only lithium manganese oxide the positive electrode comprises only lithium manganese oxide partially substituted by magnesium or aluminum (batteries A1 and B1 comprising the positive electrodes x1 and y1, respectively), the polymerization decomposition reaction of vinylene carbonate on the positive electrode is inhibited while vinylene carbonate is electrolyzed on the negative electrode side. However, particularly when the active positive electrode material is in active state as seen during charging, lithium manganese oxide, due to its oxidizing action, decomposes the electrolytic solution on the positive electrode to produce a large amount of gas. Thus, the desired effect of lessening the produced amount of gas can hardly be exerted.

(2) High Temperature Discharged Storage Test

The batteries A1 to A6, B1 to B6, C1 to C6, D1 to D6, E1 to E6 and F1 to F6 thus prepared were each subjected to 4.2 V–500 mA constant current-constant voltage charging and 500 mA constant current discharging. In some detail, the batteries were each charged to 4.2 V with a current of 500 mA (1C) at room temperature. After reaching 4.2 V, the batteries were each charged at a constant voltage of 4.2 V until the charging current reached 25 mA or less. After 10 minutes of discontinuance, the batteries were each discharged to a discharge termination voltage of 3.0 V with a current of 500 mA (1C). The batteries were each stored at a temperature of 60° C. for 20 days, and then measured for battery voltage and produced amount of gas. The results are set forth in Tables 3 and 4 below. The results of the relationship between the added amount (%) of lithium cobalt oxide and the produced amount (ml) of gas of the batteries A1 to A6, B1 to B6, C1 to C6, D1 to D6, E1 to E6, and F1 to F6 thus stored discharged are graphically illustrated in FIG. 2.

TABLE 3

| Type of Battery | Type of positive electrode | Electrolytic solution | Voltage drop (V) | Produced amount of gas (ml) | % Recovery of capacity |
|---|---|---|---|---|---|
| A1 | x1 | α | 1.20 | 4.8 | 94 |
| A2 | x2 | α | 0.56 | 3.3 | 95 |
| A3 | x3 | α | 0.29 | 1.8 | 95 |
| A4 | x4 | α | 0.21 | 1.1 | 95 |
| A5 | x5 | α | 0.18 | 0.9 | 95 |
| A6 | x6 | α | 0.11 | 0.5 | 97 |
| B1 | y1 | α | 1.27 | 5.0 | 95 |
| B2 | y2 | α | 0.63 | 3.4 | 95 |
| B3 | y3 | α | 0.31 | 1.9 | 95 |
| B4 | y4 | α | 0.23 | 1.2 | 95 |
| B5 | y5 | α | 0.11 | 1.0 | 95 |
| B6 | y6 | α | 0.11 | 0.5 | 97 |
| C1 | z1 | α | 3.45 | 9.0 | 92 |
| C3 | z3 | α | 1.60 | 6.2 | 93 |
| C2 | z2 | α | 1.00 | 3.8 | 93 |
| C4 | z4 | α | 0.42 | 2.1 | 94 |
| C5 | z5 | α | 0.38 | 1.9 | 94 |
| C6 | z6 | α | 0.11 | 0.5 | 97 |

TABLE 4

| Type of battery | Type of positive electrode | Electrolytic solution | Voltage drop (V) | Produced amount of gas (ml) | % Recovery of capacity |
|---|---|---|---|---|---|
| D1 | x1 | β | 3.00 | 8.0 | 93 |
| D2 | x2 | β | 1.21 | 5.7 | 94 |
| D3 | x3 | β | 0.87 | 3.2 | 94 |
| D4 | x4 | β | 0.37 | 1.9 | 94 |
| D5 | x5 | β | 0.30 | 1.6 | 95 |
| D6 | x6 | β | 0.17 | 0.8 | 96 |
| E1 | y1 | β | 3.11 | 8.3 | 93 |
| E2 | y2 | β | 1.37 | 5.8 | 94 |
| E3 | y3 | β | 0.90 | 3.3 | 94 |
| E4 | y4 | β | 0.39 | 2.0 | 94 |
| E5 | y5 | β | 0.33 | 1.7 | 95 |
| E6 | y6 | β | 0.17 | 0.8 | 96 |

TABLE 4-continued

| Type of battery | Type of positive electrode | Electrolytic solution | Voltage drop (V) | Produced amount of gas (ml) | % Recovery of capacity |
|---|---|---|---|---|---|
| F1 | z1 | β | 3.44 | 8.9 | 92 |
| F2 | z2 | β | 1.62 | 6.3 | 93 |
| F3 | z3 | β | 0.98 | 3.8 | 93 |
| F4 | z4 | β | 0.43 | 2.1 | 94 |
| F5 | z5 | β | 0.37 | 1.8 | 94 |
| F6 | z6 | β | 0.17 | 0.8 | 96 |

The batteries comprising unsubstituted lithium manganese oxide as a positive electrode (batteries C1 and F1 comprising the positive electrode z1) produce a large amount of gas particularly during high temperature discharged storage. This is presumably because manganese is eluted (ionized) from the crystal lattice and then consumes electron on the negative electrode to undergo deposition thereon, causing a rise in the potential of the negative electrode that eventually causes the decomposition reaction of the electrolytic solution or electrolyte salt on the negative electrode. When almost discharged, lithium manganese oxide has manganese eluted from the crystal lattice more frequently and the negative electrode has less lithium left behind, making it easy for the potential of the negative electrode to rise.

On the other hand, since magnesium-substituted lithium manganese oxide (batteries A1 and D1 comprising the positive electrode x1) or aluminum-substituted lithium manganese oxide (batteries B1 and E1 comprising the positive electrode y1) has its crystal lattice stabilized, manganese is eluted less frequently than unsubstituted lithium manganese oxide (battery comprising the positive electrode z1), eventually lessening the production of gas. However, this leaves something to be desired.

However, as in the batteries A2 to A6 comprising the positive electrodes x2 to x6, respectively, and the batteries B2 to B6 comprising the positive electrodes y2 to y6, respectively, as the added amount of lithium cobalt oxide increases, the produced amount of gas decreases. This is presumably because the incorporation of lithium cobalt oxide causes the elution of manganese to be buffered. However, the details are unknown.

As in the batteries A1 to A6, B1 to B6 and C1 to C6 comprising the electrolytic solution a, the incorporation of vinylene carbonate (VC) in the solvent causes a vinylene carbonate decomposition product film to be formed mainly on the negative electrode to buffer the direct deposition of manganese on the negative electrode, inhibiting the rise in the potential of the negative electrode and hence drastically reducing the produced amount of gas. However, as in the battery C1 comprising the positive electrode z1, when unsubstituted lithium manganese oxide alone is used as a positive electrode, its oxidizing effect causes vinylene carbonate to be decomposed on the positive electrode and thus consumed, i.e., polymerization-decomposed by each other, making it difficult to form a film on the negative electrode. As a result, the desired effect of lessening the produced amount of gas can hardly be exerted.

However, as in the batteries A1 to A6 comprising the positive electrodes x1 to x6, respectively, and the batteries B1 to B6 comprising the positive electrodes y1 to y6, respectively, the partial substitution of manganese by magnesium or aluminum, which itself is excellent in corrosion resistance, depresses the oxidizing action on the surface of lithium manganese oxide active positive electrode material and inhibits the polymerization decomposition of vinylene carbonate by oxidation, making it possible to form a good vinylene carbonate decomposition product film on the negative electrode.

The decomposition of vinylene carbonate proceeds normally as the potential rises during the initial charging. As a result, a decomposition product film is formed on the negative electrode. However, since lithium manganese oxide exhibits a lower electronic conductivity than lithium cobalt oxide, the decomposition of vinylene carbonate by the potential rise and the polymerization decomposition reaction of vinylene carbonate by the oxidizing action of the active positive electrode material proceed in competition with each other to cause preferential oxidative destruction by the active positive electrode material, making it less likely that a film can be formed on the negative electrode.

When manganese is partially substituted by magnesium or aluminum, the enhancement of electronic conductivity cannot be expected too much. However, since the oxidizing action of the active positive electrode material can be buffered, it is presumed that the decomposition of vinylene carbonate by the potential rise proceeds in preference to the other reaction, making it easy to form a film on the negative electrode.

Accordingly, as in the batteries C1 to C6 comprising the positive electrodes z1 to z6, respectively, when unsubstituted lithium manganese oxide is used as an active positive electrode material, a decomposition product film cannot be formed on the negative electrode even if the electrolytic solution has vinylene carbonate incorporated therein, making it impossible to exert the desired effect of vinylene carbonate. However, as in the batteries A1 to A6 comprising the positive electrodes x1 to x6, respectively, and the batteries B1 to B6 comprising the positive electrodes y1 to y6, respectively, when the oxidizing action of lithium manganese oxide is lessened by the substitution by magnesium or aluminum, the formation of a decomposition product film can be made.

As a result, the battery comprising as an active positive electrode material lithium manganese oxide having manganese partially substituted by magnesium or aluminum is not liable to elution of manganese during high temperature discharged storage that leads to the deposition of manganese on the negative electrode resulting in the rise in the potential of the negative electrode, making it possible to accomplish drastic inhibition of gas production. Namely, a serious of the phenominum: (elution of manganese during high temperature→the deposition of manganese on the negative electrode→decomposition of the electrolyte solution caused by the rise of the potential,) can be suppressed. As a result, drastic inhibition of gas production can be performed.

Figure 2:
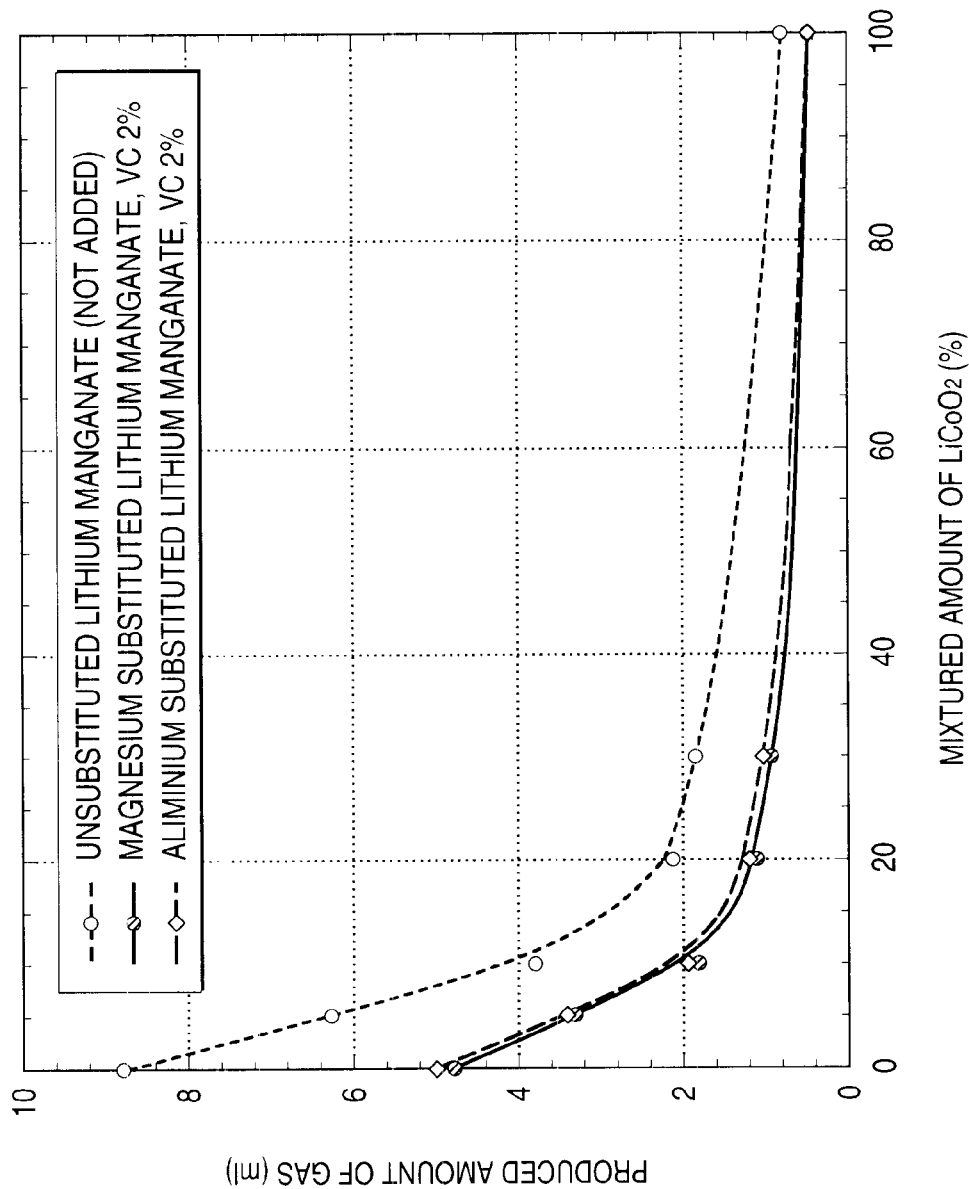
FIG. 2 is a graph illustrating the relationship between the added amount of lithium cobalt oxide and the produced amount of gas in the case where batteries are discharged to 3.0 V, and then stored at a temperature of 60° C. for 20 days.

As can be seen in FIGS. 1 and 2, the incorporation of lithium cobalt oxide is effective particularly for the reduction of the produced amount of gas during high temperature charged storage which can be little attained by the mere addition of vinylene carbonate.

6. Study of the Added Amount of Lithium Cobalt Oxide

As can be seen in the results of the high temperature storage test shown in FIGS. 1 and 2 described above, as the mixing ratio of lithium cobalt oxide increases, the amount of gas produced during high temperature storage decreases. However, it is presumed that as the mixing ratio of lithium cobalt oxide increases, the resulting overcharging resistance is deteriorated. Thus, the following overcharging test was made to study the overcharging resistance. The test battery used was formed by magnesium-substituted lithium manganese oxide ($Li_{1.07}Mn_{1.89}Mg_{0.04}O_4$) or aluminum-substituted lithium manganese oxide ($Li_{1.07}Mn_{1.89}Al_{0.04}O_4$) as lithium manganese oxide constituting the positive electrode.

The overcharging test was effected using a circuit arranged such that when the voltage of 15 samples of the battery reaches 12 V while being charged with a current of 500 mA (1C) and 1,500 mA (3C), the charging current is cut. Table 5 illustrates the results of observation of abnormality (operation of battery safety valve, leakage of electrolytic solution) on batteries comprising vinylene carbonate (batteries comprising the electrolytic solution α) and batteries free of vinylene carbonate (batteries comprising the electrolytic solution β). In Table 5, ○ indicates that none of 15 samples show abnormality, Δ indicates that some of 15 samples show abnormality (the figure in parentheses indicates the number of batteries showing abnormality), and x indicates that all of 15 samples show abnormality.

dency was observed with batteries comprising aluminum-substituted lithium manganese oxide.

Figure 3:
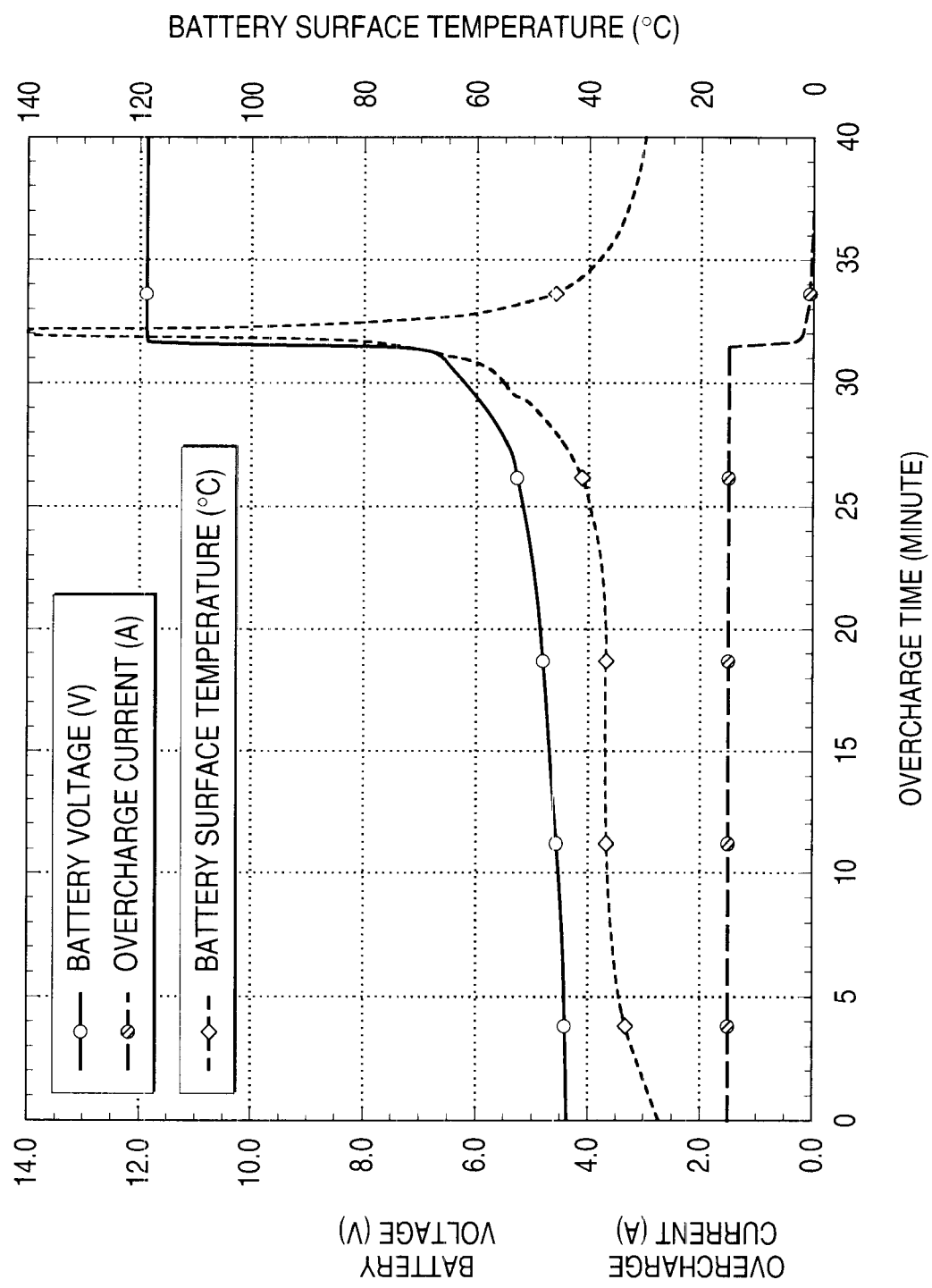
FIG. 3 is a graph illustrating the relationship between the overcharging time at 3C and the charging current, battery voltage and battery surface temperature of batteries free of vinylene carbonate.
Figure 4:
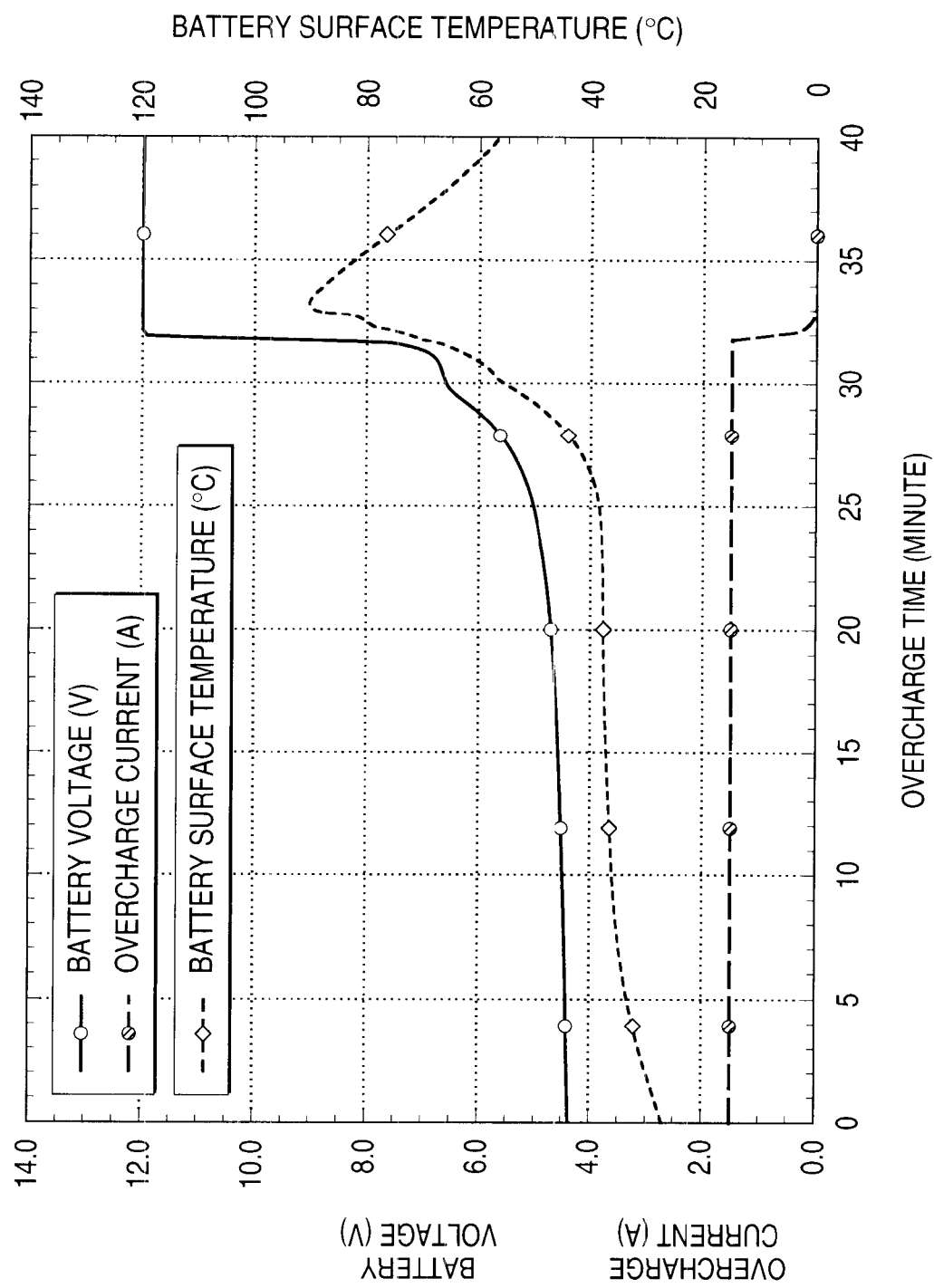
FIG. 4 is a graph illustrating the relationship between the overcharging time at 3C and the charging current, battery voltage and battery surface temperature of batteries comprising vinylene carbonate.

As can be seen in FIGS. 3 and 4, the batteries comprising vinylene carbonate incorporated therein showed a surface temperature as low as about 80° C. when the battery voltage reached 12 V. After cutting the charging current, the temperature rose but merely due to heat inertia. Thereafter, heat dissipation occurred gradually. On the contrary, the batteries free of vinylene carbonate showed a surface temperature of higher than 150° C. when the battery voltage reached 12 V. The safety valve then operated to cause heat dissipation resulting in sudden drop of the battery temperature. Thus, it is presumed that the incorporation of vinylene carbonate causes the formation of a film on the surface of the electrode that relaxes the reaction of the active material with the electrolytic solution or electrolyte to buffer thermal runaway during overcharging.

TABLE 5

| Kind of substituted lithium manganese oxide | Mixing ratio of $LiCoO_2$ | Electrolytic solution | Over-charging 1C | Over-charging 3C | Electrolytic solution | Over-charging 1C | Over-charging 3C |
|---|---|---|---|---|---|---|---|
| $Li_{1.07}Mn_{1.89}Mg_{0.04}O_4$ | 0 | α | ○ | ○ | β | ○ | ○ |
| $Li_{1.07}Mn_{1.89}Mg_{0.04}O_4$ | 0.05 | α | ○ | ○ | β | ○ | ○ |
| $Li_{1.07}Mn_{1.89}Mg_{0.04}O_4$ | 0.1 | α | ○ | ○ | β | ○ | ○ |
| $Li_{1.07}Mn_{1.89}Mg_{0.04}O_4$ | 0.2 | α | ○ | ○ | β | ○ | Δ (4) |
| $Li_{1.07}Mn_{1.89}Mg_{0.04}O_4$ | 0.3 | α | ○ | Δ (1) | β | ○ | x |
| $Li_{1.07}Mn_{1.89}Mg_{0.04}O_4$ | 0.4 | α | ○ | Δ (6) | β | ○ | x |
| $Li_{1.07}Mn_{1.89}Mg_{0.04}O_4$ | 0.5 | α | ○ | x | β | ○ | x |
| $Li_{1.07}Mn_{1.89}Mg_{0.04}O_4$ | 1.0 | α | ○ | x | β | ○ | x |
| $Li_{1.07}Mn_{1.89}Mg_{0.04}O_4$ | 0 | α | ○ | ○ | β | ○ | ○ |
| $Li_{1.07}Mn_{1.89}Al_{0.04}O_4$ | 0.05 | α | ○ | ○ | β | ○ | ○ |
| $Li_{1.07}Mn_{1.89}Al_{0.04}O_4$ | 0.1 | α | ○ | ○ | β | ○ | ○ |
| $Li_{1.07}Mn_{1.89}Al_{0.04}O_4$ | 0.2 | α | ○ | ○ | β | ○ | Δ (7) |
| $Li_{1.07}Mn_{1.89}Al_{0.04}O_4$ | 0.3 | α | ○ | Δ (2) | β | ○ | x |
| $Li_{1.07}Mn_{1.89}Al_{0.04}O_4$ | 0.4 | α | ○ | Δ (9) | β | ○ | x |
| $Li_{1.07}Mn_{1.89}Al_{0.04}O_4$ | 0.5 | α | ○ | x | β | ○ | x |
| $Li_{1.07}Mn_{1.89}Al_{0.04}O_4$ | 1.0 | α | ○ | x | β | ○ | x |

As can be seen in Table 5 above, none of these batteries showed abnormality in 1C overcharging. However, while the incorporation of lithium cobalt oxide in an amount of less than 10% by weight, within which the properties of lithium cobalt oxide are little dominant, caused no abnormalities, the incorporation of lithium cobalt oxide in an amount of 30% by weight or more caused abnormalities. Some of the batteries comprising lithium cobalt oxide incorporated therein in an amount of 20% by weight showed abnormalities while the others didn't.

On the contrary, in the case where vinylene carbonate was incorporated (batteries comprising the electrolytic solution α), the incorporation of lithium cobalt oxide in an amount of less than 20% by weight caused no abnormalities while the incorporation of lithium cobalt oxide in an amount of 50% by weight or more caused abnormalities. Some of the batteries comprising lithium cobalt oxide incorporated therein in an amount of from 30% to 40% by weight showed abnormalities while the others didn't. From the foregoing standpoint of view, the mixing ratio of lithium cobalt oxide is preferably less than 30% by weight.

The battery comprising a positive electrode having a lithium cobalt oxide content of 20% by weight was measured for 3C overcharging properties to see the difference between those comprising and free of vinylene carbonate (VC). The results are shown in FIG. 3 (for those free of VC) and FIG. 4 (for those comprising 2% of VC). FIGS. 3 and 4 indicate only the data of batteries comprising magnesium-substituted lithium manganese oxide. However, similar ten- The foregoing results show that the mixing ratio of lithium cobalt oxide is preferably less than 30% by weight, more preferably 20% by weight or less.

7. Study of the Added Amount of Vinylene Carbonate

Batteries comprising as a positive electrode a mixture of magnesium-substituted spinel type lithium manganese oxide $Li_{1.07}Mn_{1.89}Mg_{0.04}O_4$ or aluminum-substituted spinel type lithium manganese oxide $Li_{1.07}Mn_{1.89}Mg_{0.04}O_4$ as a main active positive electrode material and $LiCoO_2$ (mixing ratio:20% by weight) were subjected to the same high temperature storage test as mentioned above with the added amount of vinylene carbonate (% based on the total weight of solvents) being varied. The results are set forth in Tables 6 and 7 below. Table 6 illustrates the voltage drop, produced amount of gas, percent retention of capacity and percent recovery of capacity of the batteries which had been charged to 4.2 V and stored at a temperature of 60° C. for 20 days in the same manner as mentioned above. Table 7 illustrates the voltage drop, produced amount of gas and percent recovery of capacity of the batteries which had been charged to 3.0 V and stored at a temperature of 60° C. for 20 days.

TABLE 6

| Type of battery | % Added amount of VC | Voltage drop (V) | Produced amount of gas (ml) | % Retention of capacity | % Recovery of capacity |
|---|---|---|---|---|---|
| D3 | 0 | 0.12 | 2.1 | 64 | 82 |
| A7 | 1 | 0.11 | 2.0 | 67 | 84 |
| A3 | 2 | 0.11 | 2.0 | 68 | 84 |
| A8 | 3 | 0.11 | 2.0 | 68 | 84 |
| A9 | 5 | 0.10 | 1.9 | 69 | 84 |
| E3 | 0 | 0.12 | 2.1 | 63 | 81 |
| B7 | 1 | 0.11 | 2.1 | 66 | 82 |
| B3 | 2 | 0.11 | 2.1 | 67 | 83 |
| B8 | 3 | 0.11 | 2.0 | 68 | 84 |
| B9 | 5 | 0.10 | 2.0 | 68 | 84 |

TABLE 7

| Type of battery | % Added amount of VC | Voltage drop (V) | Produced amount of gas (ml) | % Recovery of capacity |
|---|---|---|---|---|
| D3 | 0 | 0.37 | 1.9 | 94 |
| A7 | 1 | 0.29 | 1.3 | 95 |
| A3 | 2 | 0.21 | 1.1 | 95 |
| A8 | 3 | 0.21 | 1.1 | 95 |
| A9 | 5 | 0.19 | 1.0 | 95 |
| E3 | 0 | 0.39 | 2.0 | 94 |
| B7 | 1 | 0.31 | 1.4 | 95 |
| B3 | 2 | 0.23 | 1.2 | 95 |
| B8 | 3 | 0.22 | 1.1 | 95 |
| B9 | 5 | 0.20 | 1.0 | 95 |

As can be seen in Tables 6 and 7 above, the incorporation of vinylene carbonate in the solvent makes it possible to inhibit the production of gas and improve the percent retention of capacity and the percent recovery of capacity.

Batteries comprising as a positive electrode a mixture of magnesium-substituted spinel type lithium manganese oxide $Li_{1.07}Mn_{1.89}Mg_{0.04}O_4$ as a main active positive electrode material and $LiCoO_2$ (mixing ratio: 20% by weight) were subjected to charging-discharging cycle test with the added amount of vinylene carbonate being varied. In some detail, at a temperature of 60° C., the batteries were charged with a current of 500 mA (1C) to 4.2 V. After reaching 4.2 V, the batteries were charged at a constant voltage of 4.2 V until the charging current reached 25 mA or less. After 10 minutes of discontinuance, the batteries were then discharged with a current of 500 mA (1C) until the discharge termination voltage reached 3.0 V. At every cycle, the batteries were measured for discharge capacity to determine the percent retention of capacity. The results are set forth in FIG. 5. Further, batteries comprising as a positive electrode a mixture of aluminum-substituted spinel type lithium manganese oxide $Li_{1.07}Mn_{1.89}Al_{0.04}O_4$ as a main active positive electrode material and $LiCoO_2$ (mixing ratio:20% by weight) were subjected to charging-discharging cycle test at a temperature of 60° C. with the added amount of vinylene carbonate being varied. At every cycle, these batteries were measured for discharge capacity to determine the percent retention of capacity in the same manner as mentioned above. The results are set forth in FIG. 6.

Figure 5:
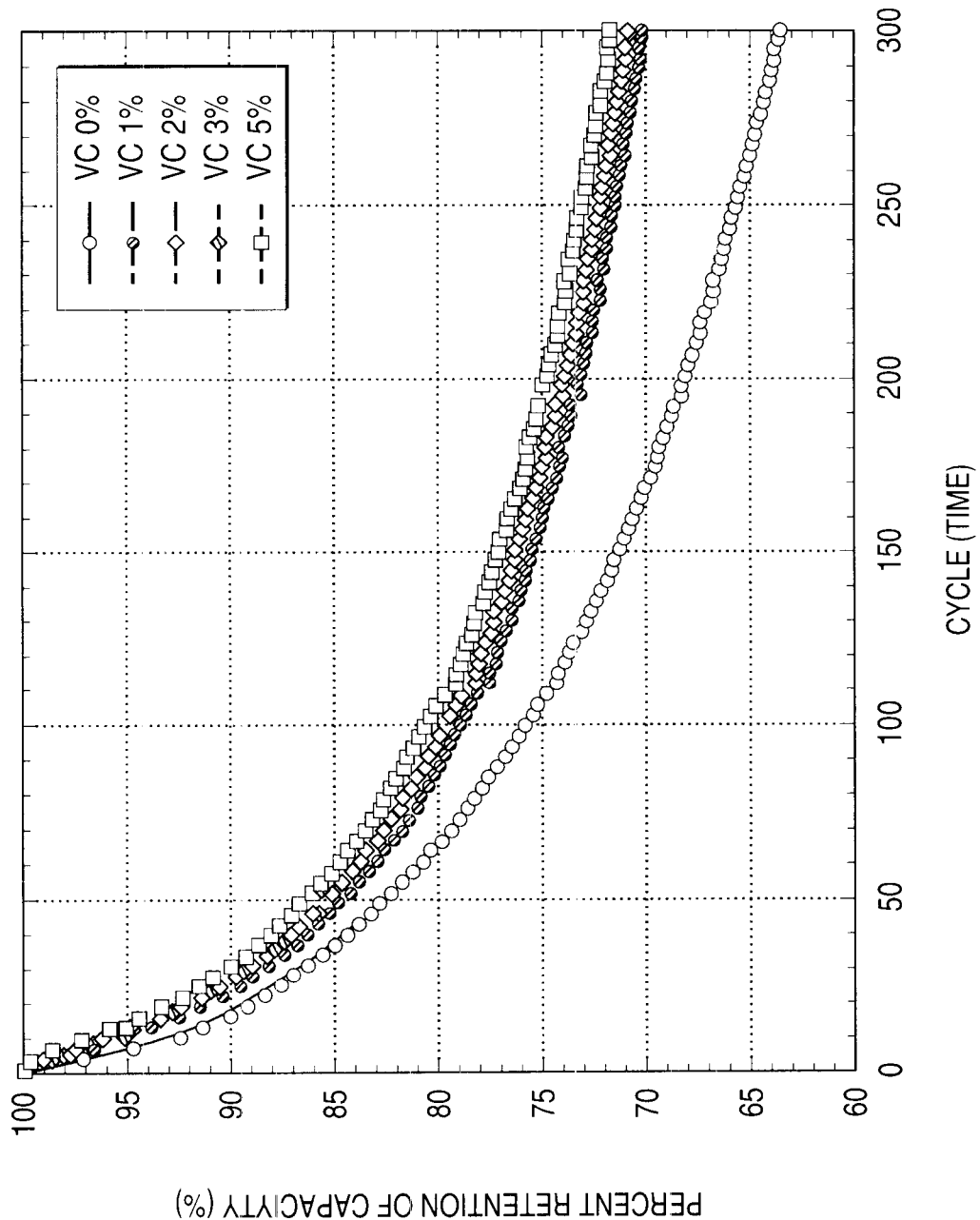
FIG. 5 is a graph illustrating the relationship between the charging-discharging cycle and the percent retention of capacity at 60° C. of batteries comprising magnesium-substituted lithium manganese oxide as a main active positive electrode material.
Figure 6:
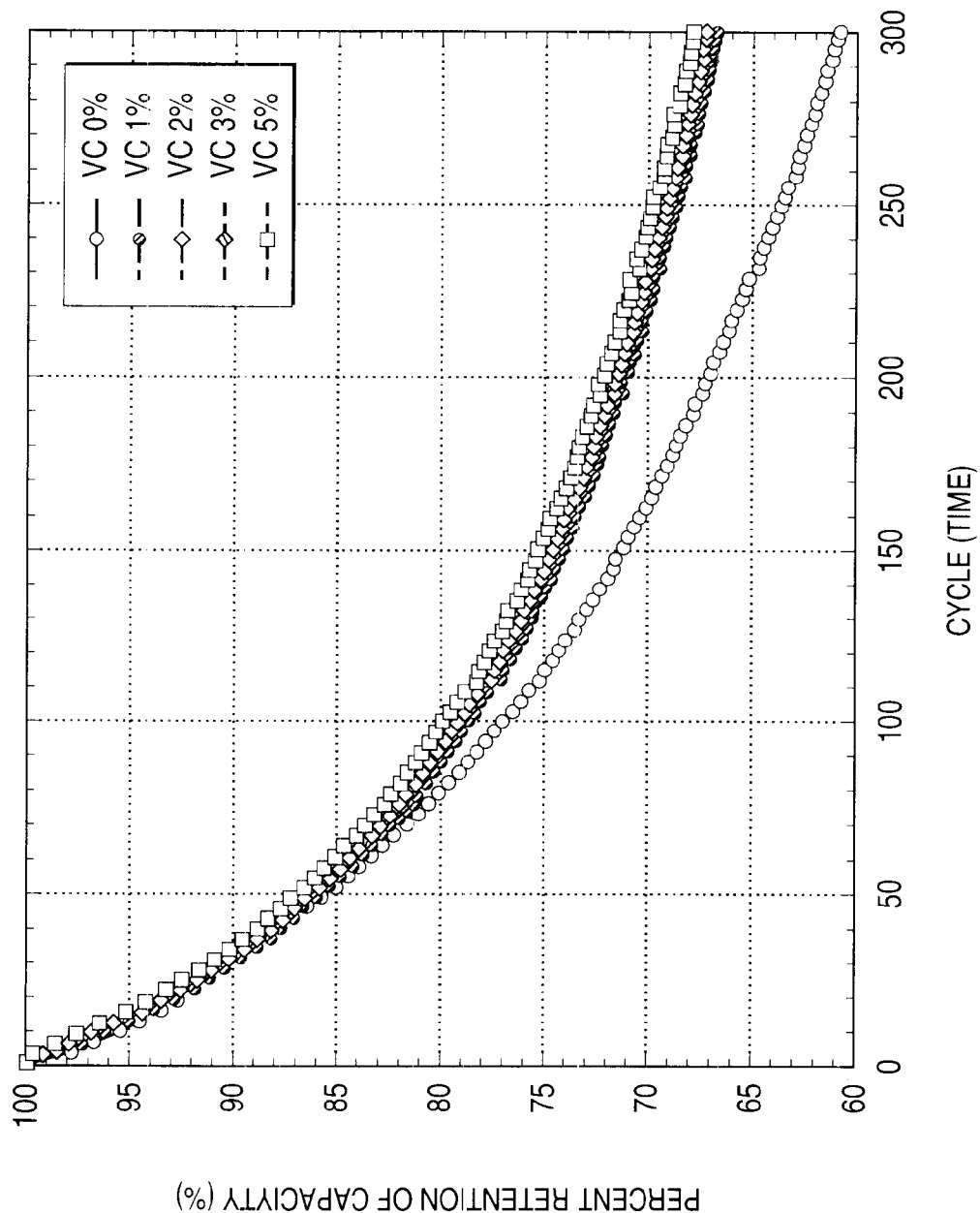
FIG. 6 is a graph illustrating the relationship between the charging-discharging cycle and the percent retention of capacity at 60° C. of batteries comprising aluminum-substituted lithium manganese oxide as a main active positive electrode material.

As can be seen in FIGS. 5 and 6, the incorporation of vinylene carbonate (VC) in the solvent makes it possible to enhance the percent retention of capacity after 300 cycles at a temperature of 60° C. It can also be seen that when the added amount of vinylene carbonate (VC) is about 3% (by weight) based on the total weight of solvents, the percent retention of capacity can be less enhanced.

Batteries comprising as a positive electrode a mixture of magnesium-substituted spinel type lithium manganese oxide $Li_{1.07}Mn_{1.89}Mg_{0.04}O_4$ or aluminum-substituted spinnel type lithium manganese oxide $Li_{1.07}Mn_{1.89}Al_{0.04}O_4$ as a main active positive electrode material and $LiCoO_2$ (mixing ratio: 20% by weight) were subjected to charging and discharging with the added amount of vinylene carbonate being varied. In some detail, at a temperature of −10° C., the batteries were charged with a current of 500 mA (1C) to 4.2 V. After reaching 4.2 V, the batteries were charged at a constant voltage of 4.2 V until the charging current reached 25 mA or less. After 10 minutes of discontinuance, the batteries were discharged with a current of 500 mA (1C) until the discharge termination voltage reached 3.0V. The batteries were the measured for discharge capacity. The results are set forth in FIG. 7.

Figure 7:
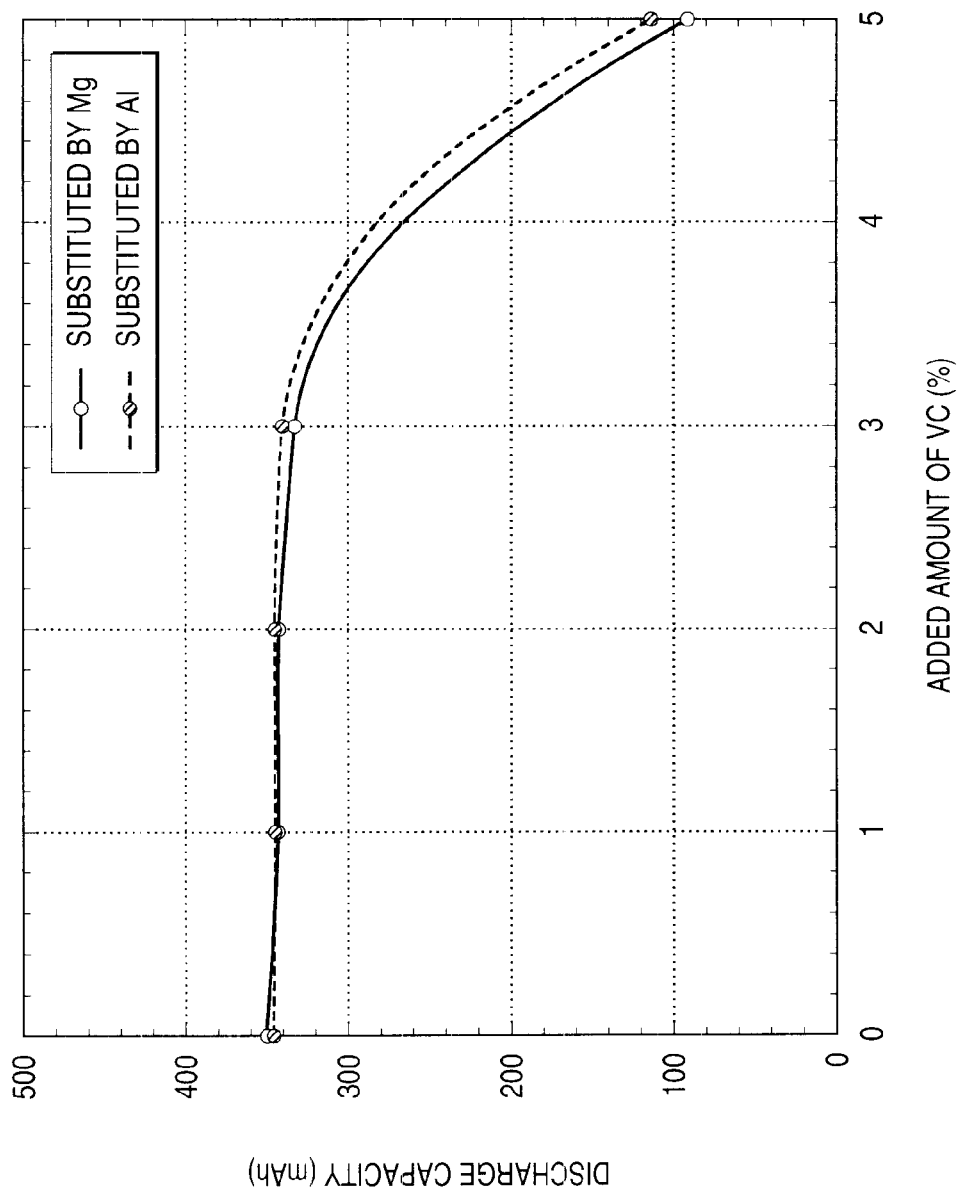
FIG. 7 is a graph illustrating the relationship between the added amount of vinylene carbonate and the discharge capacity.

As can be seen in FIG. 7, when the added amount of vinylene carbonate exceeds 3% (by weight), the resulting discharge properties at −10° C. is deteriorated. This is presumably because as the added amount of vinylene carbonate increases, the amount of so-called resistive components on the surface of the electrode plate increases. When the added amount of vinylene carbonate increases beyond the value that gives a proper film thickness, the mere effect of increase in the film thickness is remarkably exerted, drastically deteriorating the discharge properties. It can thus be seen that the added amount of vinylene carbonate is related to the thickness of the film formed on the electrode plate. Thus, as the added amount of vinylene carbonate increases, the thickness of the film formed on the surface of the electrode plate increases, lowering the operating voltage during discharging and hence deteriorating properties at low temperatures or during discharging with large current.

It can be seen in these results that the added amount of vinylene carbonate is preferably 3% (by weight) or less based on the total weight of solvents.

8. Study of Substituting Elements for Lithium Manganese Oxide (1) Iron-substituted Lithium Manganese Oxide Iron-substituted spinnel type lithium manganese oxide represented by $Li_{1.07}Mn_{1.89}Fe_{0.04}O_4$ and lithium cobalt oxide represented by $LiCoO_2$ were mixed at weight ratios as set forth in Table 8 below. To the mixtures were each then added a proper amount of a carbon-based electrically conducting agent and graphite. The mixed powders thus obtained were each then processed in the same manner as mentioned above to form a mixed active positive electrode material. These mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates comprising iron-substituted spinnel type lithium manganese oxide.

(2) Cobalt-substituted Lithium Manganese Oxide

Cobalt-substituted spinnel type lithium manganese oxide represented by $Li_{1.07}Mn_{1.89}Co_{0.04}O_4$ and lithium cobalt oxide represented by $LiCoO_2$ were mixed at weight ratios as set forth in Table 8 below. To the mixtures were each then added a proper amount of a carbon-based electrically conducting agent and graphite. The mixed powders thus obtained were each then processed in the same manner as mentioned above to form a mixed active positive electrode material. These mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates comprising cobalt-substituted spinel type lithium manganese oxide.

(3) Nickel-substituted Lithium Manganese Oxide

Nickel-substituted spinel type lithium manganese oxide represented by $Li_{1.07}Mn_{1.89}Ni_{0.04}O_4$ and lithium cobalt oxide represented by $LiCoO_2$ were mixed at weight ratios as set forth in Table 8 below. To the mixtures were each then added a proper amount of a carbon-based electrically conducting agent and graphite. The mixed powders thus obtained were each then processed in the same manner as mentioned above to form a mixed active positive electrode material. These mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates comprising nickel-substituted spinel type lithium manganese oxide.

(4) Magnesium-cobalt-substituted Lithium Manganese Oxide

Magnesium-cobalt-substituted spinel type lithium manganese oxide represented by $Li_{1.07}Mn_{1.89}Mg_{0.02}O_4$ and lithium cobalt oxide represented by $LiCoO_2$ were mixed at weight ratios as set forth in Table 8 below. To the mixtures were each then added a proper amount of a carbon-based electrically conducting agent and graphite. The mixed powders thus obtained were each then processed in the same manner as mentioned above to form a mixed active positive electrode material. These mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates comprising magnesium-cobalt-substituted spinel type lithium manganese oxide.

Aluminum-cobalt-substituted Lithium Manganese Oxide

Aluminum-cobalt-substituted spinel type lithium manganese oxide represented by $Li_{1.07}Mn_{1.89}Al_{0.02}Co_{0.02}O_4$ and lithium cobalt oxide represented by $LiCoO_2$ were mixed at weight ratios as set forth in Table 8 below. To the mixtures were each then added a proper amount of a carbon-based electrically conducting agent and graphite. The mixed powders thus obtained were each then processed in the same manner as mentioned above to form a mixed active positive electrode material. These mixed active positive electrode materials were then mixed with a fluororesin-based binder at a predetermined ratio to obtain positive electrode compounds. Subsequently, these positive electrode compounds were each applied to a positive electrode collector made of aluminum foil on both sides thereof, and then dried. The coated materials were each then rolled to a predetermined thickness to obtain positive electrode plates comprising aluminum-cobalt-substituted spinel type lithium manganese oxide.

Subsequently, the various positive electrode plates were each used to prepare lithium ion batteries in the same manner as mentioned above. These lithium ion batteries were each then subjected to 4.2 V–500 mA constant current-constant voltage charging and 500 mA constant current discharging in the same manner as mentioned above. In some detail, at room temperature, these lithium ion batteries were each charged with a current of 500 mA (1C) to 4.2 V. After reaching 4.2 V, the batteries were each then charted at a constant voltage of 4.2 V until the charging current reached 25 mA or less. After 10 minutes of discontinuance, these batteries were each discharged with a current of 500 mA (IC) until the discharge termination voltage reached 3.0 V. These batteries thus charged and discharged were each stored at a temperature of 60° C. for 20 days, and then measured for produced amount of gas. The results are set forth in Table 8 below.

TABLE 8

| Mixing ratio of $LiCoO_2$ in positive electrode plate | Electrolytic solution | Produced amount of gas (ml) | | | | | | |
|---|---|---|---|---|---|---|---|---|
| | | Mg-substituted | Al-substituted | Fe-substituted | Co-substituted | Ni-substituted | Mg—Co-substituted | Al—Co-substituted |
| 0 | α | 4.8 | 5.0 | 8.9 | 8.7 | 8.9 | 5.3 | 5.5 |
| 0.05 | α | 3.3 | 3.4 | 6.3 | 6.1 | 6.1 | 3.9 | 4.1 |
| 0.1 | α | 1.8 | 1.9 | 3.9 | 3.6 | 3.8 | 2.3 | 2.5 |
| 0.2 | α | 1.1 | 1.2 | 2.0 | 2.0 | 2.2 | 1.5 | 1.6 |
| 0.3 | α | 0.9 | 1.0 | 1.7 | 1.8 | 1.9 | 1.2 | 1.3 |
| 1.0 | α | 0.5 | 0.5 | 0.5 | 0.5 | 0.5 | 0.5 | 0.5 |
| 0 | β | 8.0 | 8.3 | 8.9 | 8.7 | 8.8 | 8.3 | 8.5 |
| 0.05 | β | 5.7 | 5.7 | 6.4 | 6.1 | 6.2 | 5.9 | 6.0 |
| 0.1 | β | 3.2 | 3.2 | 3.8 | 3.7 | 3.9 | 3.3 | 3.4 |
| 0.2 | β | 1.9 | 1.9 | 2.1 | 2.0 | 2.1 | 1.9 | 2.0 |
| 0.3 | β | 1.6 | 1.6 | 1.8 | 1.7 | 1.8 | 1.6 | 1.7 |
| 1.0 | β | 0.8 | 0.8 | 0.8 | 0.8 | 0.8 | 0.8 | 0.8 |

As can be seen in Table 8 above, lithium manganese oxide substituted by iron (Fe), cobalt (Co) or nickel (Ni) cannot exert the same effect as by lithium manganese oxide substituted by magnesium (Mg) or aluminum (Al). This is presumably because the substitution by iron (Fe), cobalt (Co) or nickel (Ni) can exert a great effect of stabilizing the crystal structure of lithium manganese oxide but cannot inhibit the oxidizing action of the active material. Thus, the decomposition of vinylene carbonate by the potential rise and the polymerization decomposition reaction of vinylene carbonate by the oxidizing action of the active positive electrode material proceed in competition with each other to cause preferential oxidative destruction by the active positive electrode material, making it less likely that a film can be formed on the negative electrode.

Also when spinnel type lithium manganese oxide material having crystal lattices partially substituted by two elements, e.g., magnesium (Mg) and cobalt (Co) or aluminum and cobalt (Co) is used as an active material, the resulting effect was similar to that exerted by the use of magnesium-substituted or aluminum-substituted spinnel type lithium manganese oxide. Accordingly, once substituted by magnesium or aluminum, spinnel type lithium manganese oxide can be expected to exert similar effect of inhibiting the production of gas, though its degree being different from that of single substitution by magnesium or aluminum, even when further substituted by other elements.

As can be seen in the foregoing description, the mixing of spinnel type lithium manganese oxide having crystal lattices partially substituted by magnesium or aluminum with lithium cobalt oxide makes it possible to lessen the production of gas during charged storage. In addition, when the electrolytic solution has vinylene carbonate incorporated therein, the substitution by magnesium or aluminum makes it possible to form a decomposition product film even in a battery comprising a lithium manganese oxide-based positive electrode and hence drastically lessen the production of gas during discharged storage.

9. Study of the Amount Substituted by Substituting Element (Mg or Al)

In the foregoing magnesium-substituted lithium manganese oxide or aluminum-substituted lithium manganese oxide, the atomic ratio of lithium plus magnesium to manganese ((Li+Mg/Mn) or lithium plus aluminum to manganese ((Li+Al)/Mn) was 0.587. This atomic ratio is closely related to the energy density and 60° C. cycle properties of magnesium-substituted lithium manganese oxide or aluminum-substituted lithium manganese oxide. Thus, this atomic ratio was studied.

With the amount of substitution by magnesium in magnesium-substituted lithium manganese oxide being varied, the percent retention of capacity per atomic ratio ((Li+Mg)/Mn) at 60° C. and 300th cycle was determined. The results are indicated by the symbol ○ in FIG. 8. With the amount of substitution by aluminum in aluminum-substituted lithium manganese oxide being varied, the percent retention of capacity per atomic ratio ((Li+Al)/Mn) at 60° C. and 300th cycle was determined. The results are indicated by the symbol ○ in FIG. 9. Batteries comprising the same active material and having vinylene carbonate incorporated in the electrolytic solution in an amount of 2% (by weight based on the total weight of solvents) were measured for percent retention of capacity per atomic ratio ((Li+Mg)/Mn) at 60° C. and 300th cycle. The results are indicated by the symbol ● in FIG. 8. The percent retention of capacity per atomic ratio ((Li+Al)/Mn) at 60° C. and300th cycle was also determined. The results are indicated by the symbol ● in FIG. 9.

Figure 8:
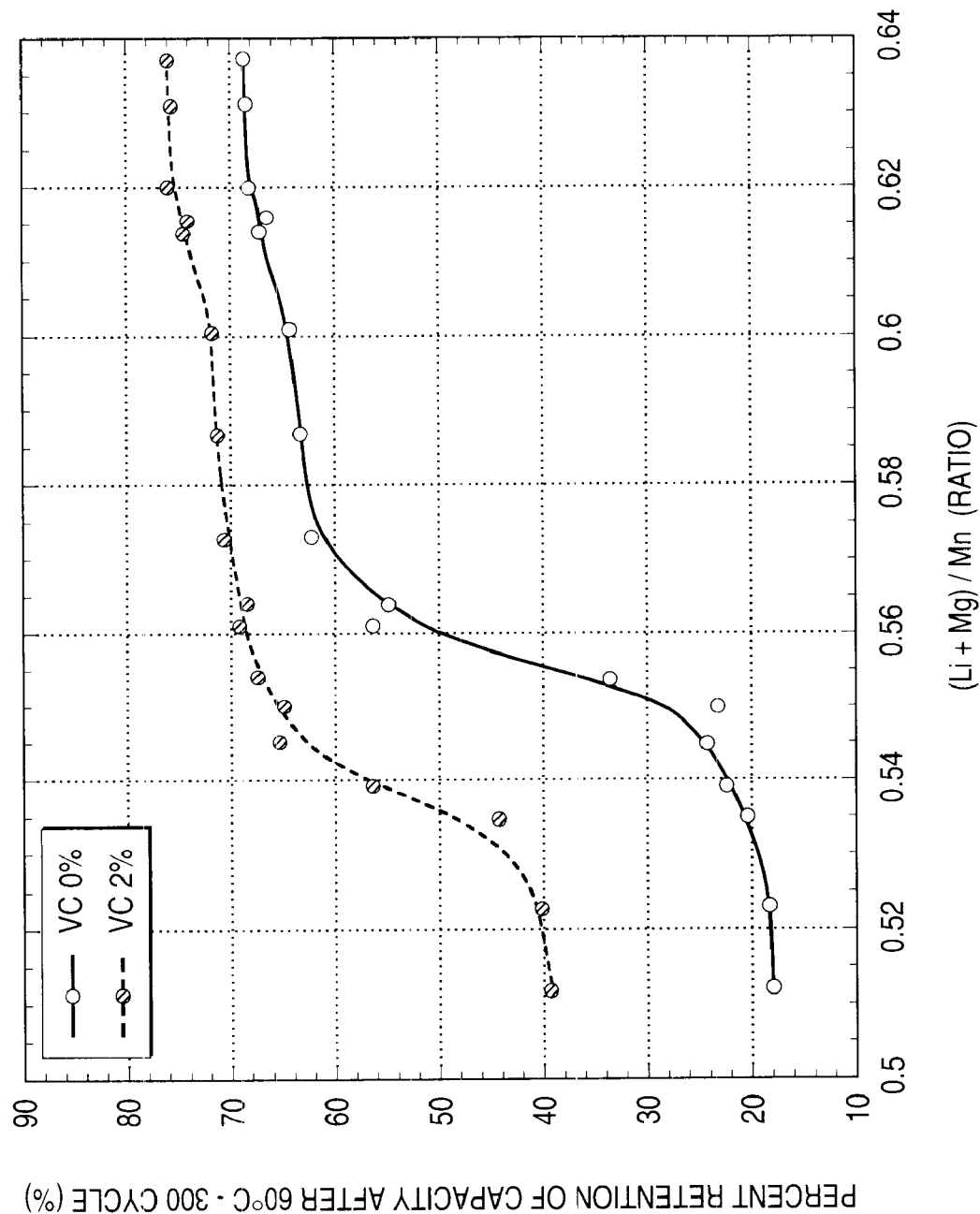
FIG. 8 is a graph illustrating the relationship between the atomic ratio ((Li+Mg)/Mn) and the percent retention of capacity at 60° C. and 300th cycle.
Figure 9:
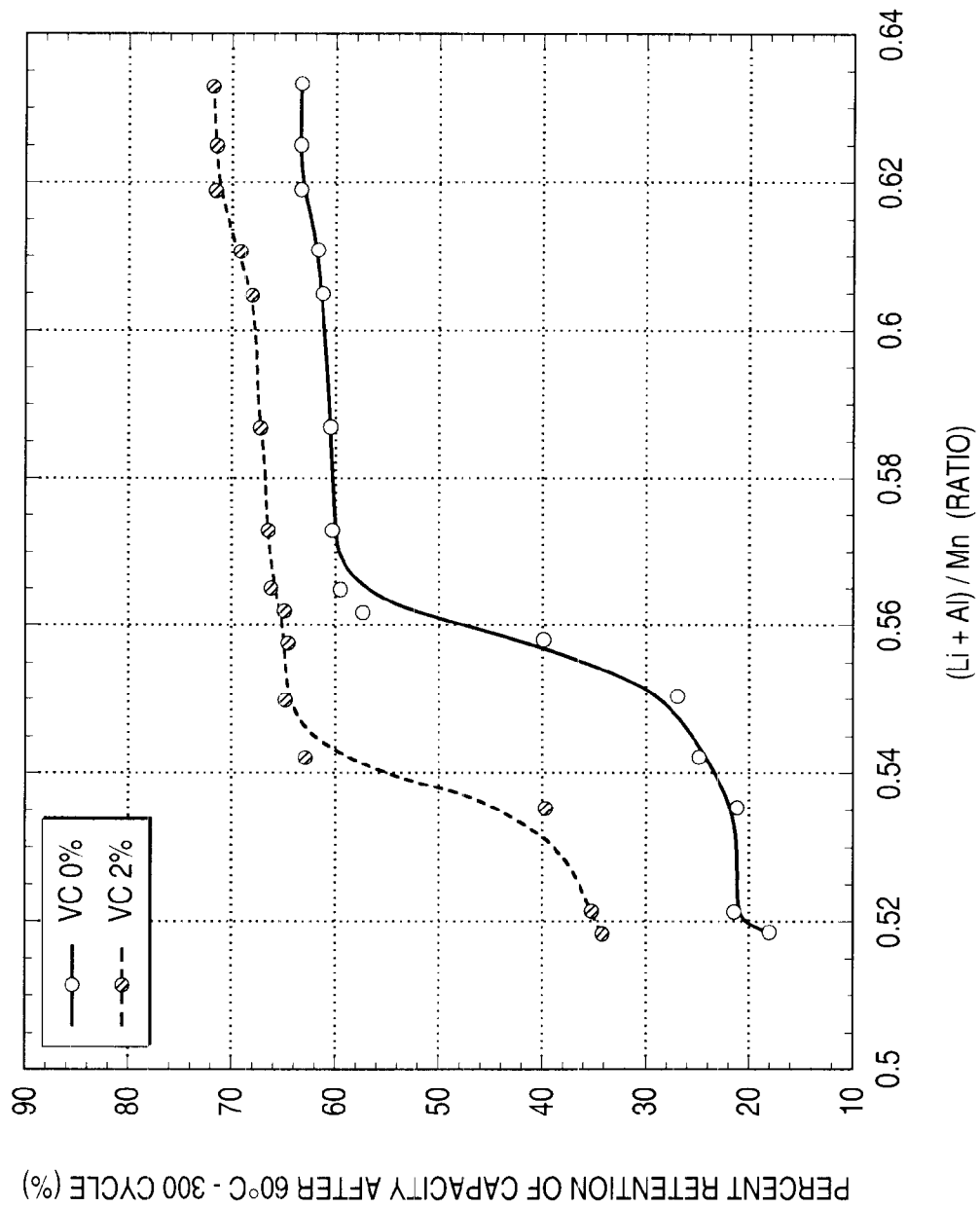
FIG. 9 is a graph illustrating the relationship between the atomic ratio ((Li+Al)/Mn) and the percent retention of capacity at 60° C. and 300th cycle.

As can be seen in FIGS. 8 and 9, the batteries comprising vinylene carbonate incorporated therein in an amount of 2% (symbol ● in FIGS. 8 and 9) exhibit a higher percent retention of capacity at 60° C. and 300th cycle than those free of vinylene carbonate (symbol ○ in FIGS. 8 and 9). This is presumably because the incorporation of vinylene carbonate makes it possible to inhibit the decomposition of electrolytic solution or electrolyte due to the deterioration of the active positive electrode material in the battery or elution of manganese.

In particular, it is thought that within a small range of (Li+Mg)/Mn (or (Li+Al)/Mn) ratio where manganese is eluted greatly at high temperatures, manganese is deposited on the negative electrode to prevent the deterioration of the surface conditions. However, within a range where manganese is eluted more, the effect of elution is exerted more strongly than the amount of film formed, causing a sudden drop of percent retention of capacity. This range presumably corresponds to a (Li+Mg)/Mn (or (Li+Al)/Mn) ratio of about 0.54. It is also thought that as the added amount of vinylene carbonate increases, this range is shifted toward smaller value. However, since the increase of the added amount of vinylene carbonate also has an adverse effect, the (Li+Mg)/Mn (or (Li+Al)/Mn) ratio is preferably predetermined to 0.54 or more.

Figure 10:
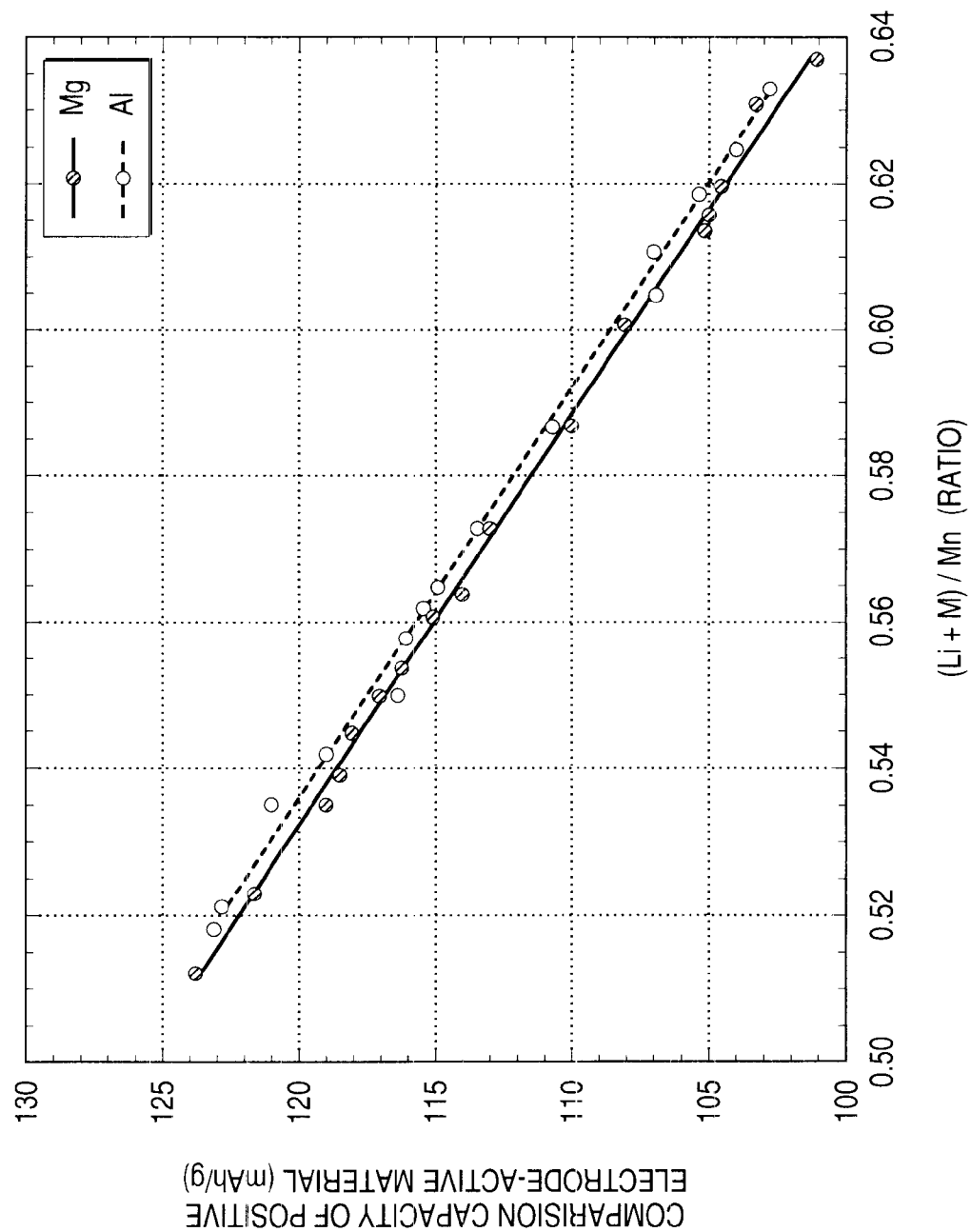
FIG. 10 is a graph illustrating the relationship between the atomic ratio ((Li+M (M=Mg, Al))/Mn) and the capacity to active positive electrode material.

The capacity of active positive electrode material per unit weight of active material based on atomic ratio was measured. The results are set forth in FIG. 10. As can be seen in FIG. 10, as (Li+Mg)/Mn (or (Li+Al)/Mn) ratio increases, the capacity to active positive electrode material ratio decreases. Accordingly, as judged from FIGS. 8 and 9, as the atomic ratio increases, the percent retention of capacity at 300 cycles at high temperatures increases. However, even when the atomic ratio increases beyond 0.62, the percent retention of capacity at 60° C. after 300 cycles no longer increases. On the other hand, as judged from FIG. 10, as the atomic ratio increases, the capacity to active positive electrode material ratio decreases. Thus, (Li+Mg)/Mn (or (Li+Al)/Mn) ratio is preferably predetermined to be 0.62 or less.

After all, from the foregoing standpoint of view, the atomic ratio is preferably predetermined such that the relationship $0.54 \leq (Li+Mg)/Mn$ (or $(Li+Al)/Mn) \leq 0.62$ can be satisfied.

10. Preparation of Polymer Solid Electrolyte Battery

The foregoing examples have been described with reference to the case where the present invention is applied to lithium ion battery. However, the present invention can be effectively applied to polymer battery (polymer solid electrolyte battery). In particular, since a polymer battery comprises a polymer having a higher viscosity than the electrolytic solution, the single use of lithium manganese oxide is greatly disadvantageous in respect to impregnation. When the present invention is applied to a polymer battery, the thickness of the positive electrode plate can be reduced. Thus, the present invention is useful in this respect as well.

The term "polymer" as used herein is meant to indicate a solid electrolyte obtained by gelatinizing a polymer selected from the group consisting of polycarbonate-based solid polymer, polyacrylonitrile-based solid polymer, copolymer or crosslinked polymer comprising two or more of these polymers and fluorine-based solid polymer such as polyvinylidene fluoride (PVdF), a lithium salt and an electrolytic solution in combination.

An example of preparation of polymer battery (polymer solid electrolyte battery) will be described hereinafter. A porous polyethylene body was sandwiched by a positive electrode plate and a negative electrode plate. The laminated material was then inserted in an outer battery case. Into the outer battery case was then injected 3 ml of an electrolytic solution obtained by mixing a 3:8 (by volume) mixture of a polyethylene glycol diacrylate (molecular weight: 1,000) and ethylene carbonate (EC) or diethyl carbonate (DEC) with an electrolytic solution comprising lithium hexafluorophosphate ($LiPF_6$) incorporated in vinylene carbonate (VC) in an amount of 1 mol/l at a volume ratio of 1:10, and then adding 5,000 ppm of t-hexylperoxy pivalate to the mixture. The electrolytic solution was then heated to a temperature of 60° C. for 3 hours so that it was hardened to prepare a polymer battery.

Polymer batteries comprising a mixed positive electrode made of magnesium-substituted lithium manganese oxide ($Li_{1.07}Mn_{1.89}Mg_{0.04}O_4$) or aluminum-substituted lithium manganese oxide ($Li_{1.07}Mn_{1.89}Al_{0.04}O_4$) as a main active positive electrode material and $LiCoO_2$ were charged to 4.2 V, stored at a temperature of 60° C. for 20 days, and then measured for high temperature storage properties in the same manner as mentioned above. The results are set forth in Table 9 below. These batteries were also discharged to 3.0 V, stored at a temperature of 60° C. for 20 days, and then measured for high temperature storage properties. The results are set forth in Table 10 below.

TABLE 9

| Type of battery | % Added amount of VC | Voltage drop (V) | Produced amount of gas (ml) | % Retention of capacity | % Recovery of capacity |
|---|---|---|---|---|---|
| G | 2 | 0.10 | 1.9 | 68 | 84 |
| H | 0 | 0.14 | 5.1 | 62 | 76 |
| I | 2 | 0.12 | 4.9 | 64 | 80 |
| J | 0 | 0.11 | 2.0 | 64 | 84 |
| K | 2 | 0.10 | 2.0 | 67 | 83 |
| L | 0 | 0.15 | 5.2 | 60 | 75 |
| M | 2 | 0.13 | 5.0 | 63 | 79 |
| N | 0 | 0.11 | 2.1 | 64 | 82 |

TABLE 10

| Type of battery | % Added amount of VC | Voltage drop (V) | Produced amount of gas (ml) | % Recovery of capacity |
|---|---|---|---|---|
| G | 2 | 0.19 | 1.0 | 96 |
| H | 0 | 2.91 | 7.5 | 94 |
| I | 2 | 1.07 | 4.3 | 94 |
| J | 0 | 0.35 | 1.8 | 95 |
| K | 2 | 0.20 | 1.1 | 96 |
| L | 0 | 3.01 | 7.7 | 94 |
| M | 2 | 1.13 | 4.5 | 94 |
| N | 0 | 0.36 | 1.9 | 95 |

As can be seen in Tables 9 and 10 above, the incorporation of lithium cobalt oxide has the same effect on polymer battery as on lithium ion battery.

As mentioned above, in accordance with the present invention, the use of a positive electrode comprising magnesium-substituted spinnel type lithium manganese oxide or aluminum-substituted spinnel type lithium manganese oxide as a main active positive electrode material having a proper amount of lithium cobalt oxide incorporated therein and an electrolytic solution having vinylene carbonate incorporated therein in a proper amount makes it possible to obtain a non-aqueous battery having excellent high temperature properties and storage properties and a good overcharging resistance.

The foregoing embodiments of implication of the present invention have been described with reference to the case where lithium manganese oxide and lithium cobalt oxide are mixed under compression, impact and shearing developed by a mechanofusion apparatus so that lithium cobalt oxide comes in electrical contact with lithium manganese oxide. However, since magnesium-substituted lithium manganese oxide (or aluminum-substituted lithium manganese oxide) exhibits a better electronic conductivity than unsubstituted lithium manganese oxide, these materials maybe mixed in slurried form without using mechanofusion apparatus.

In the foregoing embodiments of implication of the present invention, it has been described that the spinnel type lithium manganese oxide having crystal lattices partially substituted by magnesium or aluminum needs to be predetermined such that the atomic ratio satisfies the relationship $0.54 \leq (Li+Mg)/Mn$ (or $(Li+Al)/Mn) \leq 0.62$. In this case, when the spinnel type lithium manganese oxide having crystal lattices partially substituted by magnesium or aluminum is represented by the general formula $Li_{1+x}Mn_{2-y}MzO_4$ (in which M is Mg or Al) the atomic ratio satisfies the relationship $0.54 \leq (1+X)+Z/(2-Y) \leq 0.62$.

In the case where the atomic ratio is restricted to satisfy the relationship $0.54 \leq (1+X)+Z/(2-Y) \leq 0.62$, X, Y and X need to be restricted to satisfy the relationships $-0.15 \leq X \leq 0.15$, $Y \leq 0.5$, and $0 \leq Z \leq 0.1$.

What is claimed is:

1. A non-aqueous secondary battery comprising a negative electrode made of an active negative electrode material capable of intercalating/deintercalating lithium ion, a positive electrode made of spinnel type lithium manganese oxide as a main active positive electrode material and an electrolyte containing a non-aqueous solvent, wherein said positive electrode comprises lithium cobalt oxide in admixture with the spinnel lithium manganese oxide having crystal lattices partially substituted by magnesium or aluminum and said non-aqueous solvent comprises vinylene carbonate incorporated therein.

2. The non-aqueous secondary battery according to claim 1, wherein said spinnel type lithium manganese oxide having crystal lattices partially substituted by magnesium or aluminum and said lithium cobalt oxide are added in admixture so as to satisfy the relationship $0.05 \leq B/(A+B) \leq 0.3$ in which A represents the mass of said spinnel lithium manganese oxide and B represents the mass of said lithium cobalt oxide.

3. The non-aqueous secondary battery according to claim 1, wherein said spinnel type lithium manganese oxide having crystal lattices partially substituted by magnesium or aluminum and said lithium cobalt oxide are added in admixture so as to satisfy the relationship $0.05 \leq B/(A+B) < 0.2$ in which A represents the mass of said spinnel lithium manganese oxide and B represents the mass of said lithium cobalt oxide.

4. The non-aqueous secondary battery according to claim 1, wherein said vinylene carbonate is incorporated therein in an amount of 3% or less based on the total mass of the non-aqueous solvent.

5. The non-aqueous secondary battery according to claim 1, wherein said spinnel type lithium manganese oxide having crystal lattices partially substituted by magnesium or aluminum is represented by the general formula $Li_{1+x}Mn_{2-y}M_zO_4$ in which M represents Mg or Al; and X, Y and Z satisfy the following relationships:

$$0.54 \leq (1+X)+Z/(2-Y) \leq 0.62;$$

$$-0.15 \leq X \leq 0.15;$$

$$Y \leq 0.5;$$

and $$0 < Z \leq 0.1$$

6. The non-aqueous secondary battery according to claim 1, wherein said electrolyte containing a non-aqueous solvent is selected from the group consisting of organic electrolytic solution and high molecular solid electrolyte.

7. The non-aqueous secondary battery according to claim 1, wherein said positive electrode active material is mixed so that lithium cobalt oxide comes in electrical contact with magnesium-substituted spinnel type lithium manganese oxide.

8. The non-aqueous secondary battery according to claim 7, wherein said positive electrode active material further comprises a fluororesin-based binder.

9. The non-aqueous secondary battery according to claim 1, wherein said positive electrode is constituted by a positive electrode collector and an active material formed on a surface of the positive electrode collector.

10. The non-aqueous secondary battery according to claim 1, wherein said positive electrode is constituted by a positive electrode collector and an active material formed on both sides thereof.

11. The non-aqueous secondary battery according to claim 9, wherein said positive electrode collector is made of aluminum foil.

12. The non-aqueous secondary battery according to claim 9, wherein said positive electrode is formed by the steps of:

coating the positive electrode active material layer on both sides of the positive electrode collector, drying the positive electrode collector of step (a); and rolling the dried positive electrode collector of step (b).

13. The non-aqueous secondary battery according to claim 1, wherein content of vinylene carbonate (VC) in the non-aqueous solvent makes it possible to form a decomposition product film mainly on the negative electrode.

14. The non-aqueous secondary battery according to claim 1, wherein content of vinylene carbonate (VC) in the non-aqueous solvent is set so that decomposition product film mainly formed by electrolysis on the negative electrode overcome dissolution of manganese on the positive electrode.

15. The non-aqueous secondary battery according to claim 1, wherein the content of vinylene carbonate (VC) in the non-aqueous solvent is set so as not to form on the negative electrode by dissolution of manganese in the positive electrode.

16. The non-aqueous secondary battery according to claim 1, wherein said electrolyte is made of a solid electrolyte obtained by gelatinizing a polymer selected from the group consisting of a polycarbonate-based solid polymer, a polyacrylonitrile-based solid polymer, a copolymer or a crosslinked polymer comprising two or more of these polymers and a fluorine-based solid polymer, a lithium salt and an electrolytic solution in combination.

17. The non-aqueous secondary battery according to claim 16, wherein the fluorine-based solid polymer is polyvinylidene fluoride.

* * * * *